United States Patent [19]
Harz et al.

[11] Patent Number: 5,070,428
[45] Date of Patent: Dec. 3, 1991

[54] ENCAPSULATED SWITCHING SYSTEM WITH LONGITUDINAL COUPLING OF BUS BARS, INNER PARTITIONS, AND COUPLING FIELDS

[75] Inventors: Gerhard Harz, Regensburg; Erwin Reichl, Tegernheim, both of Fed. Rep. of Germany

[73] Assignee: Sachsenwerk Aktiengesellschaft, Regensburg, Fed. Rep. of Germany

[21] Appl. No.: 443,205

[22] Filed: Nov. 30, 1989

[30] Foreign Application Priority Data

Dec. 3, 1988 [DE] Fed. Rep. of Germany ....... 3840850

[51] Int. Cl.$^5$ ............................................. H02B 1/20
[52] U.S. Cl. .................................................... 361/341
[58] Field of Search ............................. 361/335, 341

[56] References Cited

U.S. PATENT DOCUMENTS 3,252,055 9/1962 Wilcox ................... 361/341

FOREIGN PATENT DOCUMENTS 2924430 12/1980 Fed. Rep. of Germany.
54-103522 8/1979 Japan ................... 361/341

OTHER PUBLICATIONS

C-C-SF$_6$ Block, Mittelspannungs-Schaltanlagen (1984).
Publication entitled "Stahiblechgeschotte, SF6-insulierte Schaltanlagen Typenreihe ZV2" (Steel sheet Protected, SF6 Insulated Switching Systems, Series ZV2) Calor Emag (publication 13/76/H).
BBC Switching Systems Handbook, 8th Edition, p. 414.

Primary Examiner—Leo P. Picard
Assistant Examiner—Michael W. Phillips
Attorney, Agent, or Firm—Spencer & Frank

[57] ABSTRACT

An encapsulated and partitioned switching system employing compressed gas insulation. For each bus bar system (I, II, III) there is provided a coupling field (KFI, KFII, KFIII) in which are installed a first bus bar end section ($6_I$, $6_{II}$, $6_{III}$), at least a first disconnect switch (2) and a coupling switch (3), while a second bus bar end section ($7_I$, $7_{II}$, $7_{III}$) is always disposed in an adjacent coupling field (KFI, KFII).

14 Claims, 18 Drawing Sheets

ENCAPSULATED SWITCHING SYSTEM WITH LONGITUDINAL COUPLING OF BUS BARS, INNER PARTITIONS, AND COUPLING FIELDS

BACKGROUND OF THE INVENTION

The present invention relates to an encapsulated switching system for longitudinal coupling of bus bars of multi-phase bus bar systems installed in an encapsulated switch housing having a front section, a plurality of covers, inner partitions separating portions of the bus bar systems from one another, and a plurality of coupling fields for coupling together sections of the bus bars. In a known system of this type, at least two bus bars of a bus bar system have axes arranged in a plane which is at least approximately parallel to the nearest cover. Each bus bar has a first end section and a second end section. The first and second end sections of respective bus bars are arranged in different coupling fields. Each coupling field accommodates a first disconnect switch and a coupling switch along with a respective one of the first end sections of the bus bars. A second disconnect switch is provided in each coupling field connected at one end to a respective one of the coupling switches Coupling lines are provided between another end of a respective one of the second disconnect switches and a connecting point at a respective one of the second bus bar end sections, the coupling lines being connected by way of a terminal that is brought through, in an insulated manner, either a first partition surrounding the respective second bus bar end section or one of the housing covers. The coupling switches have poles arranged in a straight line or slightly offset with respect to the front of the switch housing.

The publication entitled, "Stahlblechgeschotte, SF$_6$-insulierte Schaltanlagen Typenreihe ZV2" [Steel Sheet Protected, SF$_6$ Insulated Switching Systems, Series ZV2], Calor Emag (publication 13/76/H) discloses at page 7 a double bus bar system for which longitudinal coupling with power switches for each one of the two systems corresponds to the features of the encapsulated switching system described above.

The prior art switching system includes two superpose bus bar systems which are installed in the lower region of a switching system. Each bus bar system is connected with a power switch and with a cable terminal by way of a three-way switch. In an upper portion of each outgoing field, an upper terminal of the power switch may be brought to the cable terminal by way of current converters. Each one of the two coupling fields includes a respective first bus bar end section, an associated first three-way switch, a coupling switch in the form of a power switch and a passage for a coupling line, which couples the first bus bar end section with a second bus bar end section, disposed outside of the encapsulation. In an upper portion of the coupling fields, current and voltage converters (transformers) also be disposed. Next to the two coupling fields, there is a supplemental field in which are accommodated second bus bar end sections for both bus bar systems, each provided with a three-way switch. By way of terminals, the three-way switches are connected with coupling lines which are brought from the coupling fields to the supplemental field in two superposed planes, since the coupling lines of the individual phases of the two systems intersect one another. Otherwise, the supplemental field has no active components.

Thus, in order to longitudinally couple a two bus bar system, the prior art switching system requires, in addition to a coupling field for each bus bar system, a third field as a supplemental field in which the two second bus bar end sections and the associated three-way switches are accommodated. Moreover, the height of the switching system is increased by the coupling lines for both systems placed on top of it. Expansion of the prior art switching system to a triple bus bar system would require even more space in the building housing the switching system with respect to longitudinal coupling since the three coupling fields would require the accommodation of two supplemental fields, and three planes with coupling lines would have to be accommodated in the height direction.

The BBC Switching Systems Handbook, 8th Edition, shows at page 414 a switching diagram for longitudinal and transverse coupling for a triple bus bar system. In this disclosure, each system includes a sectionalizing switch which can be bridged by a coupling switch. Such a system is instrument intensive and space consuming and is thus not suitable for an encapsulated switching system, and in particular not for switching systems insulated with compressed gas.

SUMMARY OF THE INVENTION

It is an object of the present invention to realize longitudinal couplings in a multiple bus bar system by means of one coupling switch for each bus bar system, with minimum expenditures with respect to the switching system volume so that the feeder and outgoing fields adjacent the coupling fields remain unchanged in their internal structure without having to accommodate parts of the couplings in their interiors.

The above and other objects are accomplished, according to the invention, in the context of the encapsulated switching system first described above by providing that: (a) the respective second bus bar end sections (7I, 7II, 7III) of the bus bar systems (I, II, III) are accommodated in one of first and second adjacent coupling fields (KFI, KFII); (b) at least some of the coupling lines (8, 9, 17, 18, 21, 22, 28, 29, 81) are disposed outside of the encapsulated housing adjacent at least one of the covers; and (c) the coupling lines disposed outside of at least one of the covers (12, 19) are arranged without crossing over one another, in a plane parallel to a cover which determines one of the height and depth of the switching system.

The present invention is particularly suitable for an encapsulated, compressed gas insulated switching system in the medium voltage range up to a rated voltage of 72.5 kV. In such a switching system, sectionalization and longitudinal couplings in the course of the bus bar, as they are widely used in air-insulated switching systems, can be realized only with difficulty. In systems employing modules, configurations have been used in which the separated bus bar end sections to be coupled together are insulated and partitioned from one another, while the associated switching devices are installed in the switch and wiring spaces otherwise provided for feed-in or as outputs. When such a prior art configuration is applied to a dual bus bar system, the prior art longitudinal coupling does not employ two field widths per dual bus bar system, but rather employs a total of three field widths, in conjunction with externally disposed coupling lines in two planes.

In contrast thereto, the longitudinal coupling according to the present invention requires only two field widths for dual bus bar systems and one further field width for each further bus bar system. The coupling lines of the first two systems are crossed in principle; however, on the basis of advantageous further features of the invention, the coupling lines require only on plane to guide the external sections of the coupling lines on the rear and/or top side of the switching system. The present invention can be used in various bus bar arrangements, for example with bus bar systems that are arranged on top of or next to one another, and also in switching systems having wiring spaces at the bottom or at the top.

According to further aspects of the invention, gas insulated or solid insulated, single-pole encapsulated bus bars, as well as three-pole encapsulated systems can be employed as coupling lines.

Primarily with the first-mentioned bus bars, flexible embodiments can be realized, with the basic fields remaining almost unchanged. Moreover, the coupling lines disposed outside the encapsulation can also be connected with the coupling switch at locations otherwise intended for cable connections.

The longitudinal couplings according to the invention may also be equipped with load switches and can thus be employed as sectionalizers, selectively in conjunction with grounding variations for the bus bar sections.

BRIEF DESCRIPTION OF THE DRAWINGS

The invention will now be described in greater detail with reference to the accompanying drawing figures.

FIG. 2b is a rear view of FIG. 2a.

FIG. 3c is a rear view of FIG. 3a.

FIG. 4c is a rear view of FIG. 4a.

FIG. 6b is a rear view of FIG. 6a.

DETAILED DESCRIPTION OF THE PREFERRED EMBODIMENTS

Figure 1:
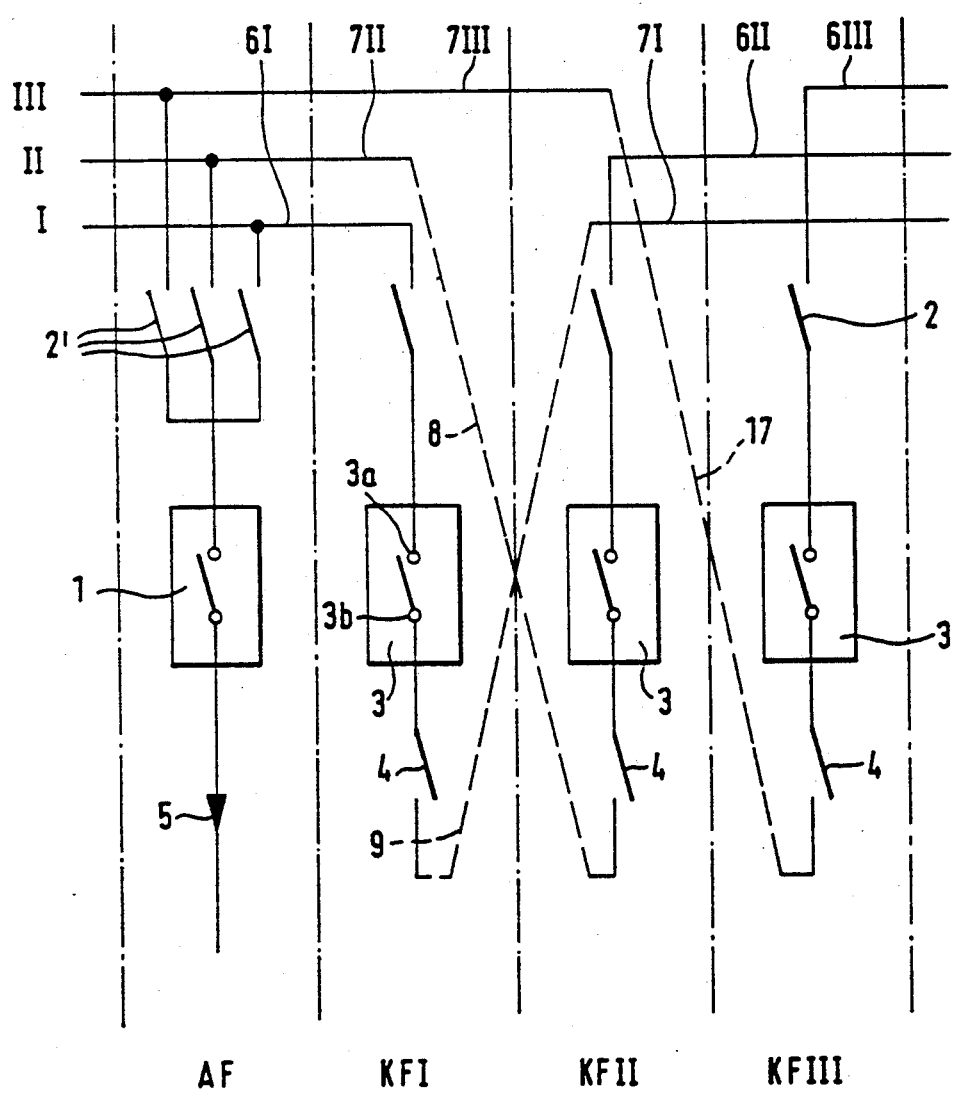
FIG. 1 is a schematic circuit diagram of an encapsulated switching system employing a longitudinal coupling according to the present invention in a triple bus bar system, shown in a single-phase arrangement.

In all figures the same reference numerals are employed for components or operating means employed in the same manner.

FIG. 1 illustrates the inventive concept in the form of a simple circuit diagram showing a three bus bar, single-phase system. In an outgoing field AF, three bus bar systems I, II, III are connected with a cable terminal 5 by way of a bus bar disconnect switch 2' for each bus bar system and a single power switch 1 connected to the disconnect switches 2'. Current and voltage converters (not shown) may additionally be provided in the wiring space for outgoing field AF. Bus bar systems I, II, III have respective first and sections 6I, 6II and 6III and respective second end sections 7I, 7II and 7III; and each bus bar system I, II, III is provided with a coupling field KFI, KFII, KFIII for longitudinal coupling of first and second bus bar end sections of the respective bus bar systems. One coupling switch 3 is provided in each coupling field and has a first contact terminal 3a connected by way of a first disconnect switch 2 of the respective bus bar system to the respective first bus bar end section 6I, 6II and 6III, while a second contact terminal 3b of the respective coupling switch 3 is connected via a respective second disconnect switch 4 and respective coupling lines 9, 8 and 17 shown in dashed lines to the respective second bus bar end section 7I, 7II, and 7III. Second bus bar end sections 7I, 7II, 7III of the respective bus bar systems I, II, III are accommodated, according to the present invention, in the two adjacent coupling fields KFI and KFII. Coupling lines 9 and 8 of bus bar systems I and II, respectively, are arranged in an oblique direction and lie crosswise opposite one another, i.e. the coupling lines cross one another over their linear extent. In a longitudinal coupling according to the invention for a triple bus bar system, coupling field KFII according to FIG. 1 is followed by an analogously equipped coupling field KFIII of the third bus bar system III which has coupling line 17 extending without crossover to second bus bar end section 7III installed in adjacent coupling field KFII.

If bus bar system III, as well as all other components associated with bus bar system III are omitted from FIG. 1, there results a embodiment according to the invention for longitudinally coupling a dual bus bar system including bus bar systems I and II. FIG. 1 shows that the longitudinal coupling according to the invention influences the length of the switching system only by one coupling field per system which has the same basic dimensions as an outgoing field, while the outgoing or feeder fields can be employed in their basic designs without having to accommodate parts of the couplings.

Coupling lines 8, 9 and 17, shown in FIG. 1 in dashed lines, are disposed essentially on the rear of the switching systems. Their spatial configuration in a three-phase mains configuration can be seen in the following figures for various switching system configurations.

Figure 2A:
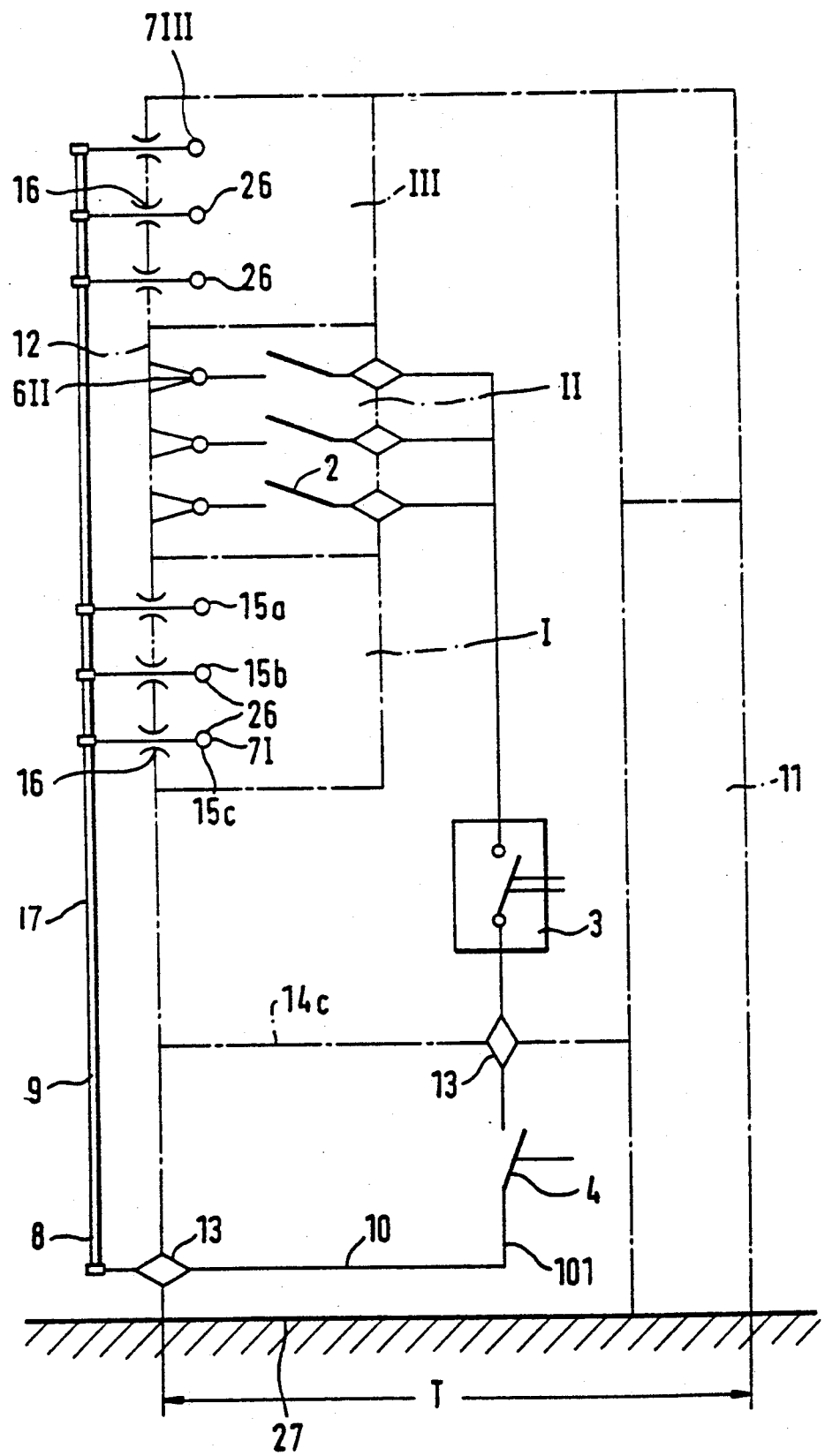
FIG. 2a is a sectional view along line 2a—2a in FIG. 2b showing field KFII of a superposed triple bus bar system including superposed bus bars and externally conducted coupling lines.
Figure 2B:
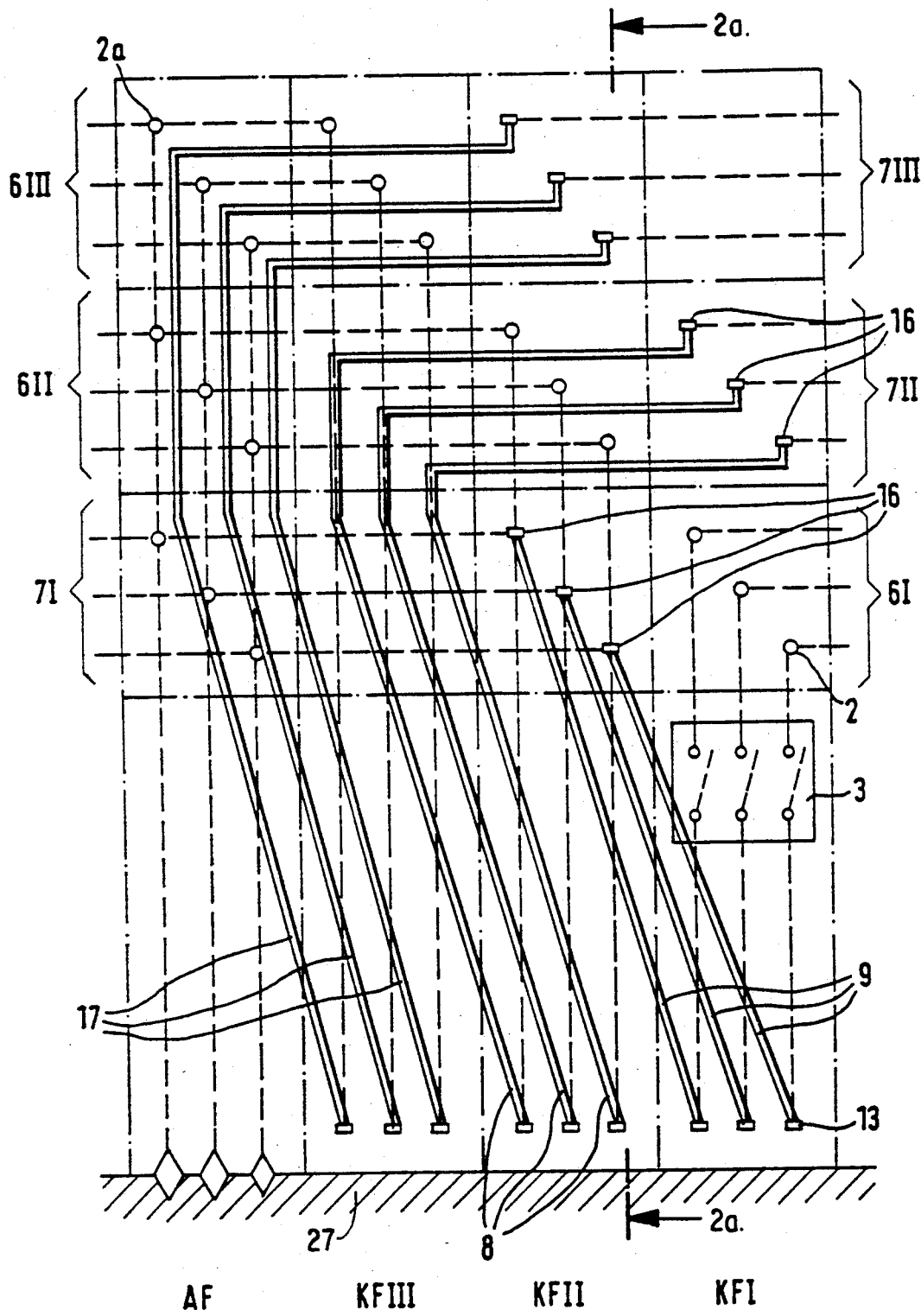
Figure 6A:
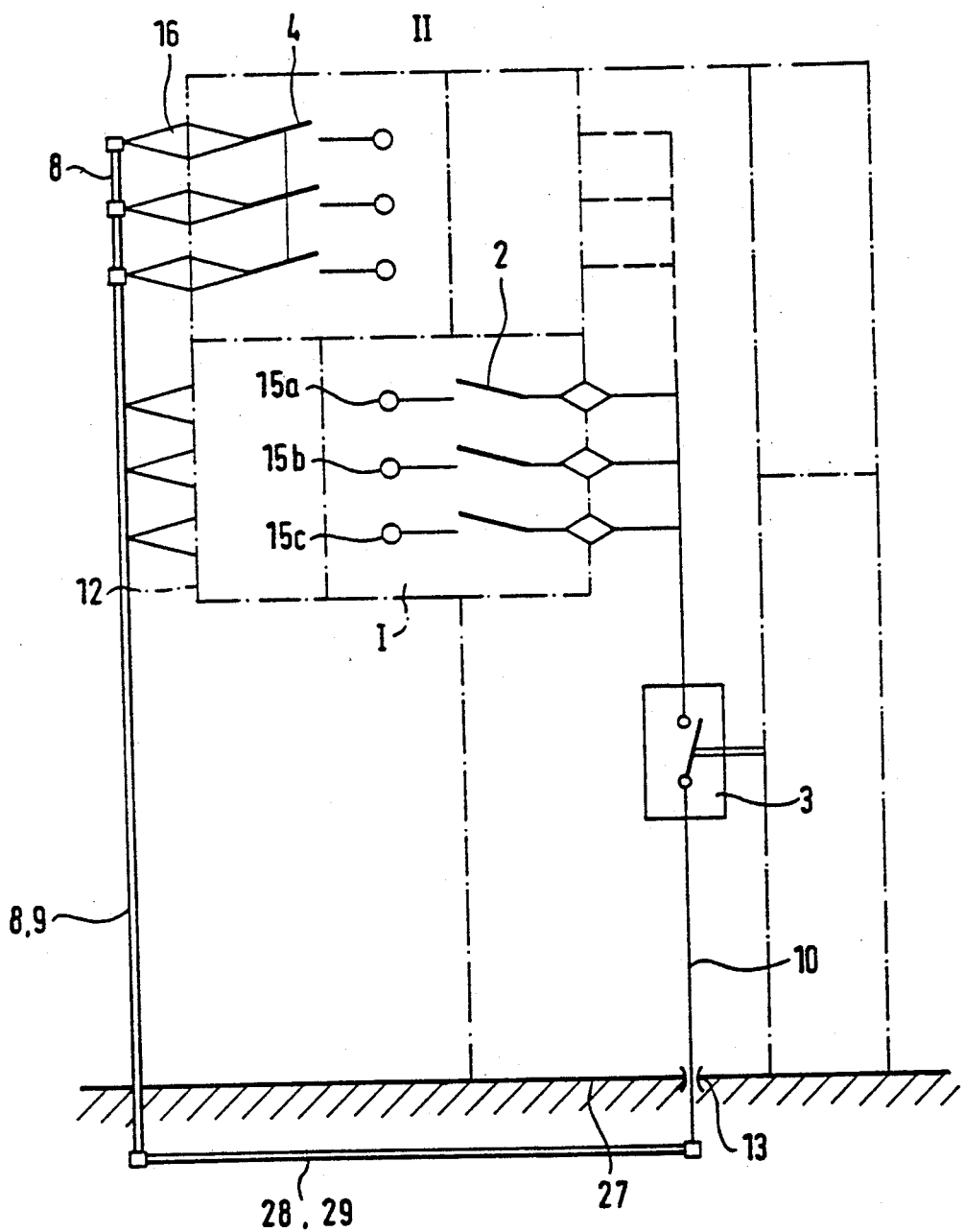
FIG. 6a is a sectional view along line 6a—6a kof FIG. 6b showing a dual bus bar system in which the second disconnect switch is disposed in the bus bar chamber and the coupling lines lie externally in both bus bar systems without crossover.

In FIGS. 2a and 2b, three bus bar, three-phase systems I, II and III are arranged one above the other, with bus bars 15a, 15b and 15c of each bus bar system being arranged in a vertical plane. Bus bar chambers formed by internal partitions are provided for the individual bus bar systems I, II and III, whereby respective first bus bar end sections 6I, 6II, 6III and their associated first disconnect switches 2 are disposed in the same partitioned chamber in respective coupling fields KFI, KFII and KFIII. In the switch area disposed in front of these partitioned chambers, there are disposed coupling switches 3 connected with the respective first disconnect switches 2, followed by the respective second disconnect switches 4. The latter may be incorporated below the respective coupling switches 3 in the vertical (angled) line sections 101 or also by phase in horizontal line sections 10. Line sections 10 connect second disconnect switches 4 with passages 13 which, in FIG. 2a, are disposed in a rear cover 12 of the switch housing; however, if the lines are conducted vertically, passages 13 may also be incorporated in cable area cover 27 (also see FIG. 6a). As shown in FIG. 2a, a partition 14c is provided through which pass the angled line sections 101 by means of passages 13, additionally reducing the possibility of error propagation between the two bus bar end sections of a system in each coupling field KFI, KFII, KFIII.

According to the invention, the second bus bar end sections 7II of the second bus bar system II are disposed in coupling field KFI and the second end sections 7I of the first bus bar system I and the second end sections 7III of the third bus bar system III are both disposed in coupling field KFII. In coupling field KFIII, bus bar systems I and II include throughgoing sections for connection of the end sections to the remaining bus bars of the respective system. In the present configuration of the longitudinal coupling, connection points 26 of the second bus bar end sections 7I, 7II and 7III are staggered in the same manner as the branches of the first disconnect switches 2 in the first end sections 6I, 6II and 6III. Connections 26 are here connected to terminals 16 disposed in rear cover 12.

In each bus bar system I, II, III, the externally disposed coupling lines 9, 8 and 17, respectively, connect the associated phases of the first and second bus bar end sections 6I and 7I; 6II and 7II; 6III and 7III between passages 13 and terminals 16. Outgoing field (AF) and coupling fields KFI, KFII, KFIII are terminated toward the front of the switch housing in the conventional manner by a drive and control switchboard 11.

In the embodiment illustrated in FIGS. 2a and 2b, there are only slight differences between coupling fields KFI, KFII, KFIII and outgoing field AF with respect to their internal configuration, namely:

(a) a second disconnect switch 4 is connected with coupling switch 3 in each coupling field either in horizontal line section 10 or in angled line section 101;

(b) passages 13 are provided either in rear cover 12 or in cover 27 of the cable area, preferably at the location of the cable terminals, for connection of coupling switches 3 and second disconnect switches 4 with external coupling lines; and (c) terminals 16 are incorporated in the bus bar chambers of second end sections (7I, 7II, 7III).

The almost complete coincidence of the internal structure of the coupling fields according to the invention permits flexible disposition and assignment of components to the coupling fields with respect to longitudinal coupling. This type of embodiment is made possible with the aid of a special line design for external coupling lines 8, 9 and 17, as indicated, for example, in FIG. 2b. Coupling lines 9, 8 and 17 of systems I, II and III, respectively, are arranged in a plane on the rear of the switch housing. Coupling lines 9 of bus bar system I extend by phases from passages 13 in straight, substantially parallel, lines to terminals 16, thereby bridging the division between coupling fields. Coupling lines 8 of bus bar system II and possibly coupling lines 17 of bus bar system III follow to the sides and lead to terminals 16 of the respective bus bar systems. Due to their angled configuration, coupling lines 8 and 17 circumvent terminals 16 of bus bar systems I and II, respectively. In dual bus bar systems, the coupling lines of second bus bar system II, and in triple bus bar systems the coupling lines of third bus bar system III, are each disposed wholly or in part on rear cover 12 of the adjacent outgoing field AF, without the interior of outgoing field AF being affected. It may merely be necessary to apply supports for coupling lines 8 and 17, respectively, on rear cover 12 of outgoing field AF.

Figure 3A:
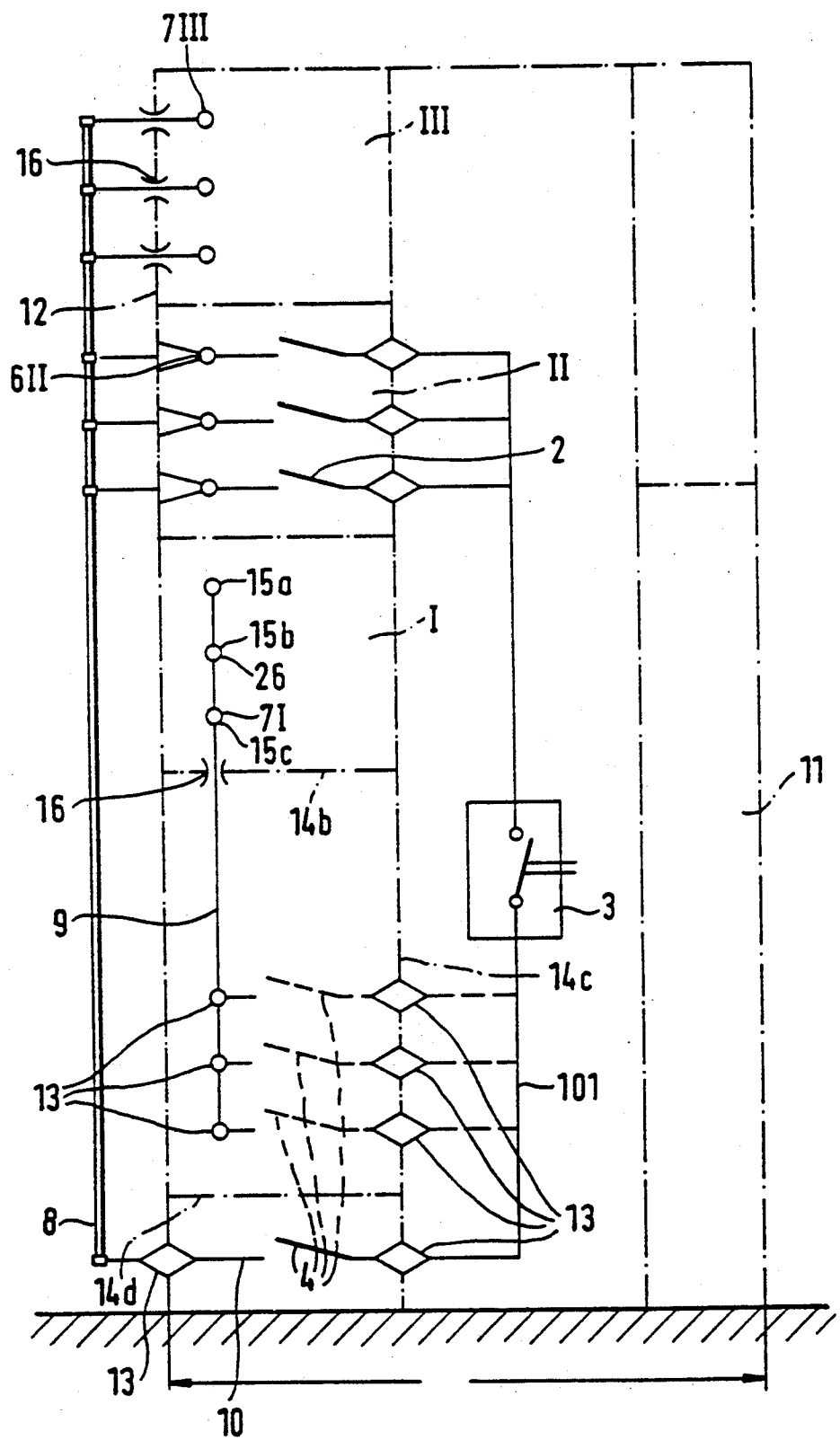
FIG. 3a is a sectional view along line 3a—3a through coupling field KFII of FIG. 3c showing a triple bus bar system similar to FIG. 2a, with internal coupling lines.
Figure 3B:
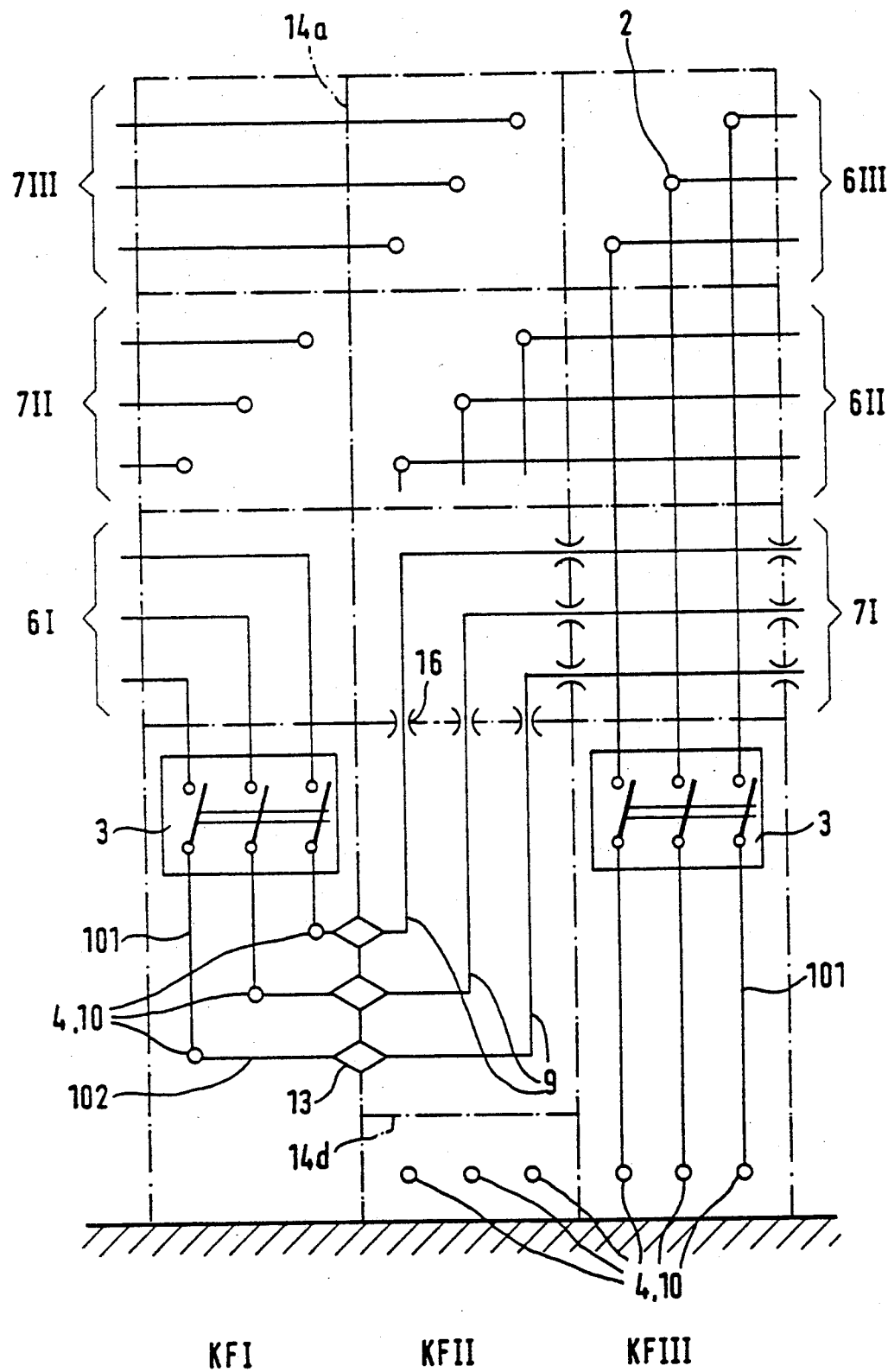
FIG. 3b is a front view of FIG. 3ak with the switch housing front cover removed.
Figure 3C:
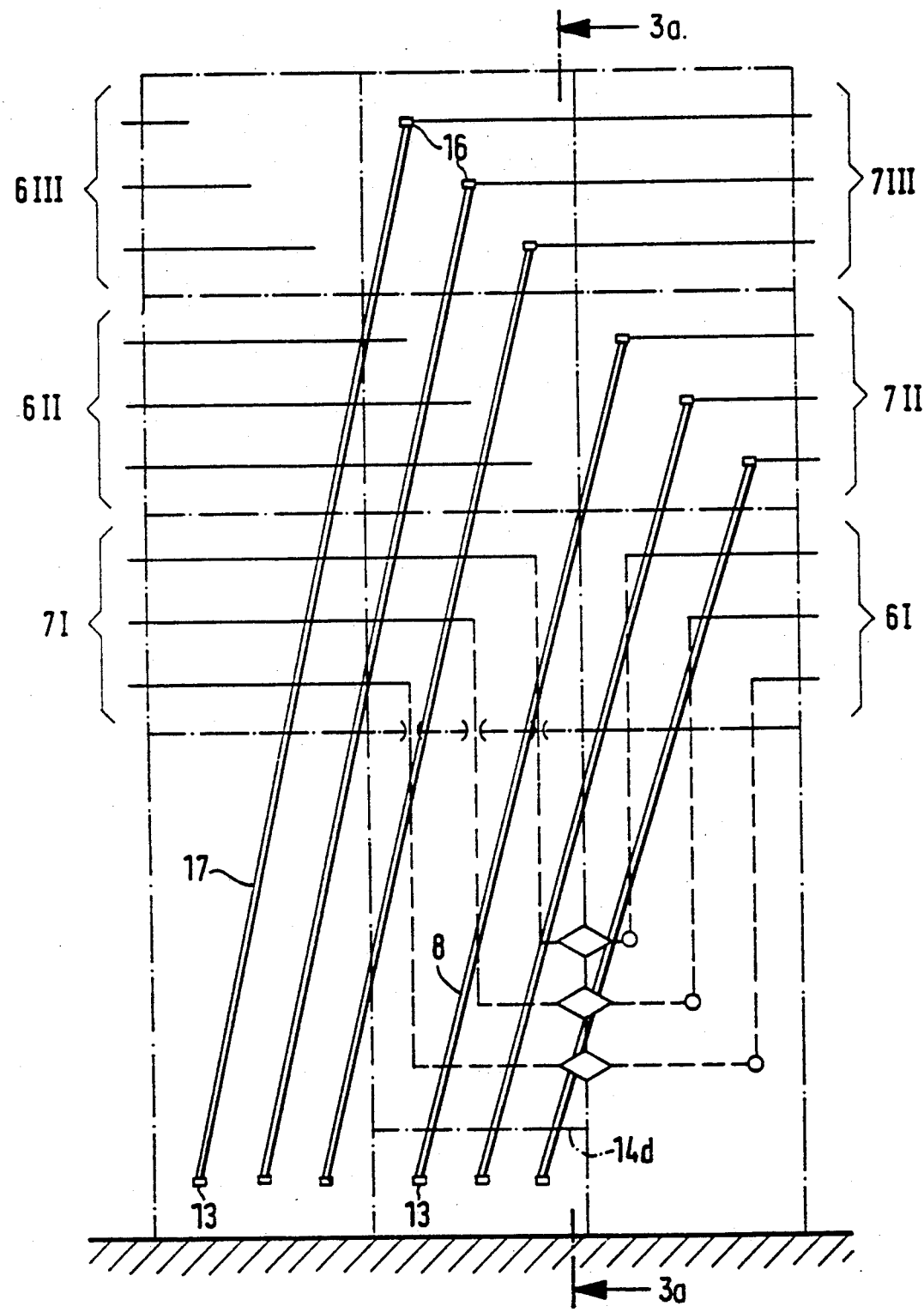

The configuration of the switching system according to FIGS. 3a to 3c is similar to that of FIGS. 2a and 2b. In this embodiment, coupling lines 9 of bus bar system I, whose bus bars lie closest to coupling switches 3 and to second disconnect switches 4, are disposed within the encapsulation of coupling fields KFI and KFII. As will be described below, coupling lines 9 thus penetrate a vertical partition 14a provided between coupling fields KFI and KFII in a particularly space-saving manner. As in the embodiment of FIGS. 2a and 2b, coupling lines 8 of bus bar system II, and possibly coupling lines 17 of bus bar system III, are attached to rear cover 12 of the switch housing. Since coupling lines 8 and 17 do not extend in the same plane as coupling lines 9 of bus bar system I, they may all be linear and arranged almost parallel to one another.

FIG. 3b shows the three coupling fields KFI, KFII and KFIII from the front after removal of drive and control switchboards 11. In coupling fields KFIII and KFI, the three-pole coupling switches 3 can be seen as well as their connections with the respective first bus bar end sections 6III and 6I, and with the second disconnect switches 4 by way of the angled line sections 101. In coupling field KFII the two switching devices 3 and 4 as well as vertical partition 14c are not shown in order to make it easier to follow the path of the coupling lines 9 which lie behind the switching devices.

According to FIGS. 3a and 3b, the lines of bus bar system I start at first end sections 6I of the three bus bars 15a, 15b, 15c and lead through the first disconnect switches 2 disposed in the bus bar chamber, through vertical partition 14c to coupling switches 3. In this case, second disconnect switches 4 are included in horizontal line sections 10 and are connected with coupling switches 3 by way of passages 13 and angled sections 101. In this embodiment as well, the second disconnect switches 4 are separated from coupling switches 3 by vertical partition 14c in order to prevent the propagation of interferences between the bus bar sections of each system.

FIGS. 3a and 3b, in particular, further show that coupling lines 9 of bus bar system I extend in coupling field KFI from the rear terminals of the second disconnect switch 4 via the angled line sections 102 to passages 13 provided in a vertical partition 14a. All three phases of the once angled coupling lines 9 in coupling field KFII (FIG. 3a) travel in a plane defined by the axes of bus bars 15a, 15b, 15c from passages 13 to terminals 16 in a horizontal partition 14b and from there to connecting points 26 with second bus bar end sections 7I. At connecting points 26, second end sections 7I end phase by phase, each time at a distance sufficient for high voltages from the terminal 16 of the adjacent phase. However, coupling lines 9 could also extend in a plane parallel to the plane of the bus bar axes to thus avoid the differences in length of second bus bar end section 7I and to stagger connecting points 26 by phases in the same manner as with the first bus bar end sections and in the outgoing fields, respectively. According to FIGS. 3ak and 3b, line sections 10 of bus bar system II and coupling lines 9 of bus bar system I are disposed in the lower portion of coupling field KFII and are separated from one another by a horizontal partition 14d.

Figure 3D:
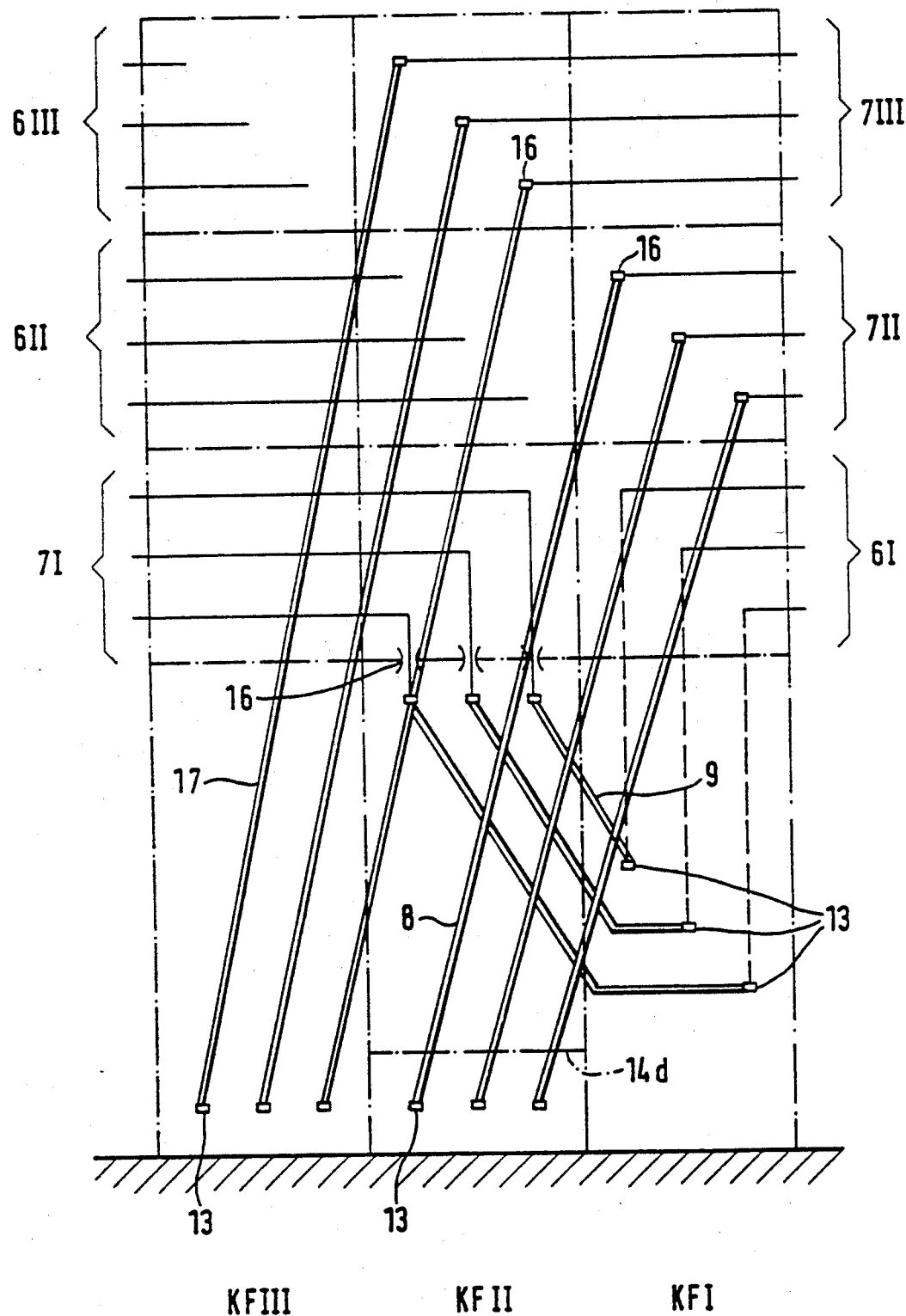
FIG. 3d kis a rear view to that of FIG. 3c showing another embodiment with the coupling lines lying externally in all bus bar systems.
Figure 3E:
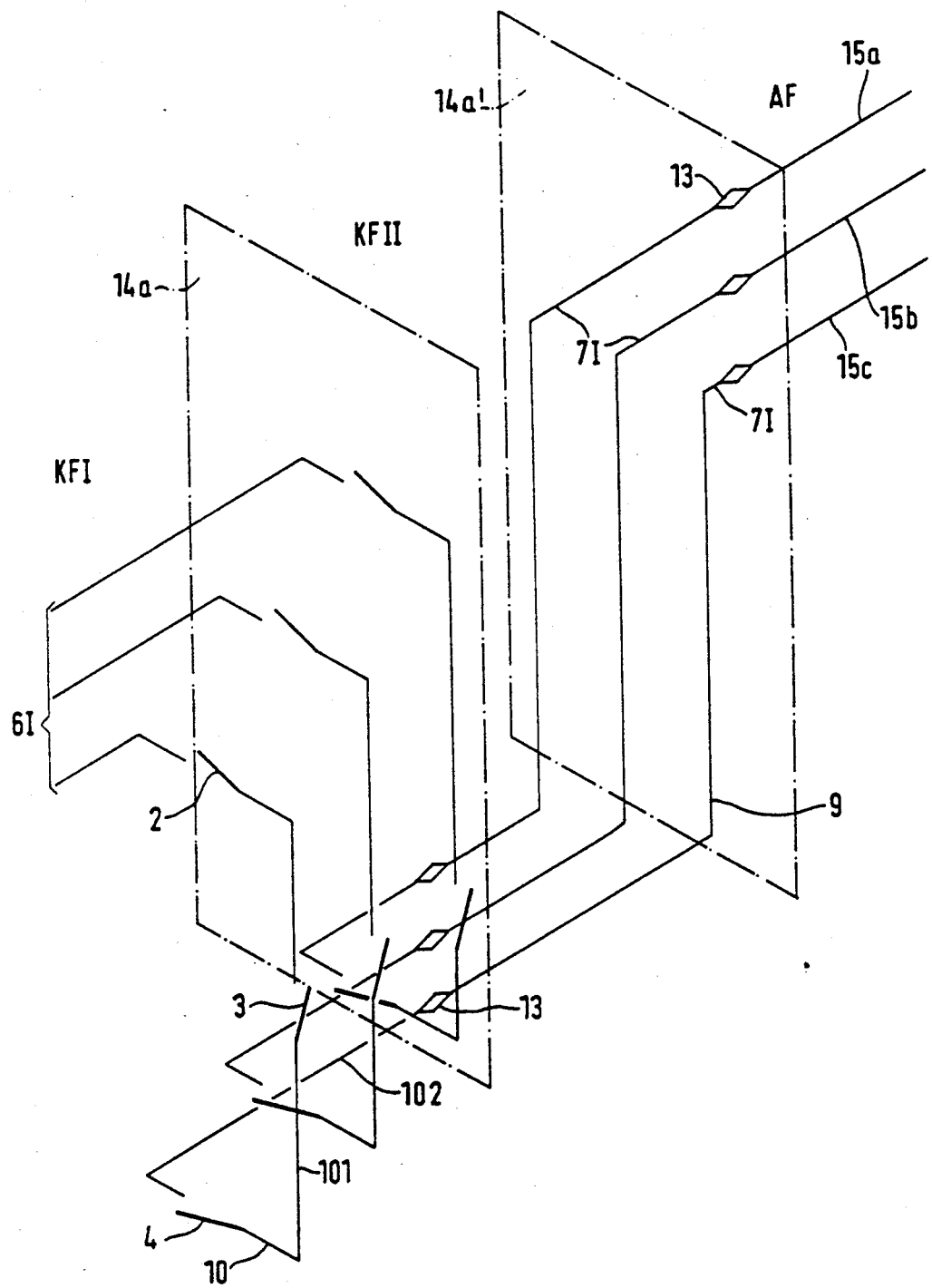
FIG. 3e is a perspective view showing the line arrangement in the first bus bar system (I) of FIGS. 3ak and 3b.

For a better understanding of the line arrangement of bus bar system I, this arrangement is shown in a perspective view in FIG. 3e with reference to FIGS. 3a and 3b. Thus, the first bus bar end sections 6I in the course of the bus bar layout extend from the left edge of the paper toward the top right. They are followed at a right angle thereto by a first disconnect switch 2 for each phase. For the sake of easier understanding, the partition between the bus bar chamber and the switch chamber (i.e. partition 14c) is not shown. From first disconnect switch 2, the lines extend by phase toward the vertically arranged coupling switches 3 and from there via vertical and horizontal line sections 101 and 10, respectively, to the horizontally arranged second disconnect switches 4. The drawing shows that the three phases of second disconnect switches 4 are staggered in height analogously to first disconnect switches 2. The rear terminals of second disconnect switches 4 connect with angled line sections 102 which constitute the connections to the three vertically superposed passages 13 in partition 14a. Behind partition 14a, all three phases continue in one and the same plane to coupling lines 9 and to second bus bar end sections 7I arranged at a right angle thereto. The plane in which the two bus bar end sections 6I and 7I as well as coupling lines 9 and angled line sections 102 are arranged, is parallel to the plane in which the three phases of coupling switch 3 and vertical line sections 101 are disposed. The three phases of first disconnect switch 2 and of second disconnect switch 4 extend at different heights perpendicularly to these two planes and staggered in height.

The second bus bar end sections 7I pass through passages 13 in a further vertical partition 14a and continue as phase-specific bus bars 15a, 15b, 15c kinto the adjacent outgoing field AF and into further parts of the second bus bar section of the switching system.

In the switching system of FIGS. 3a, 3b, 3c, rear cover 12 extends vertically to the bottom surface of the switch housing and encloses coupling lines 9 of bus bar system I. Alternatively, rear cover 12 could be bent so that coupling lines 9 extend outside of rear cover 12. Then, as shown in FIG. 3d, a rear view results in which coupling lines 8 and 9 are crossed in different planes. Within coupling fields KFI and KFII, only line sections 10 belonging to the same bus bar system extend from the respective second disconnect switch 4 to passages 13 in rear cover 12, and the horizontal partition 14d in coupling field KFII is no longer necessary. With reference to FIG. 3a, the terminals of the second disconnect switch 4 in coupling field KFI are brought in a straight line to passages 13 which, according to FIG. 3d, are also fastened in rear cover 12. Thus, without any disadvantages, the embodiment of FIG. 3d results in a lower structural height for the coupling fields. The lines of bus bar system II, and possibly bus bar system III here coincide with those of FIGS. 3a and 3c.

The above explanations show that the problems of crossed coupling lines occur only between bus bar systems I and II, while bus bar system III, in principle, can always be connected by means of uncrossed coupling lines 17. This is all very clear in the figures discussed above. For that reason, the following embodiments will be limited to longitudinal couplings in the more frequently encountered dual bus bar systems.

FIGS. 4a to 4e show the longitudinal coupling for a dual bus bar system of low structural height in which bus bar systems I and II are arranged above a switch chamber and next to one another. In order for the depth of the switching system not to become too great, bus bars 15a, 15b, 15c are advantageously installed in triangular form, with the axes of two bars 15a and 15c lying in a plane which is parallel to an upper cover 19 (FIG. 4a) of the switch housing. From the bus bar chambers including the first disconnect switches 2, angled leads 30 lead to respective coupling switches 3.

Figure 4A:
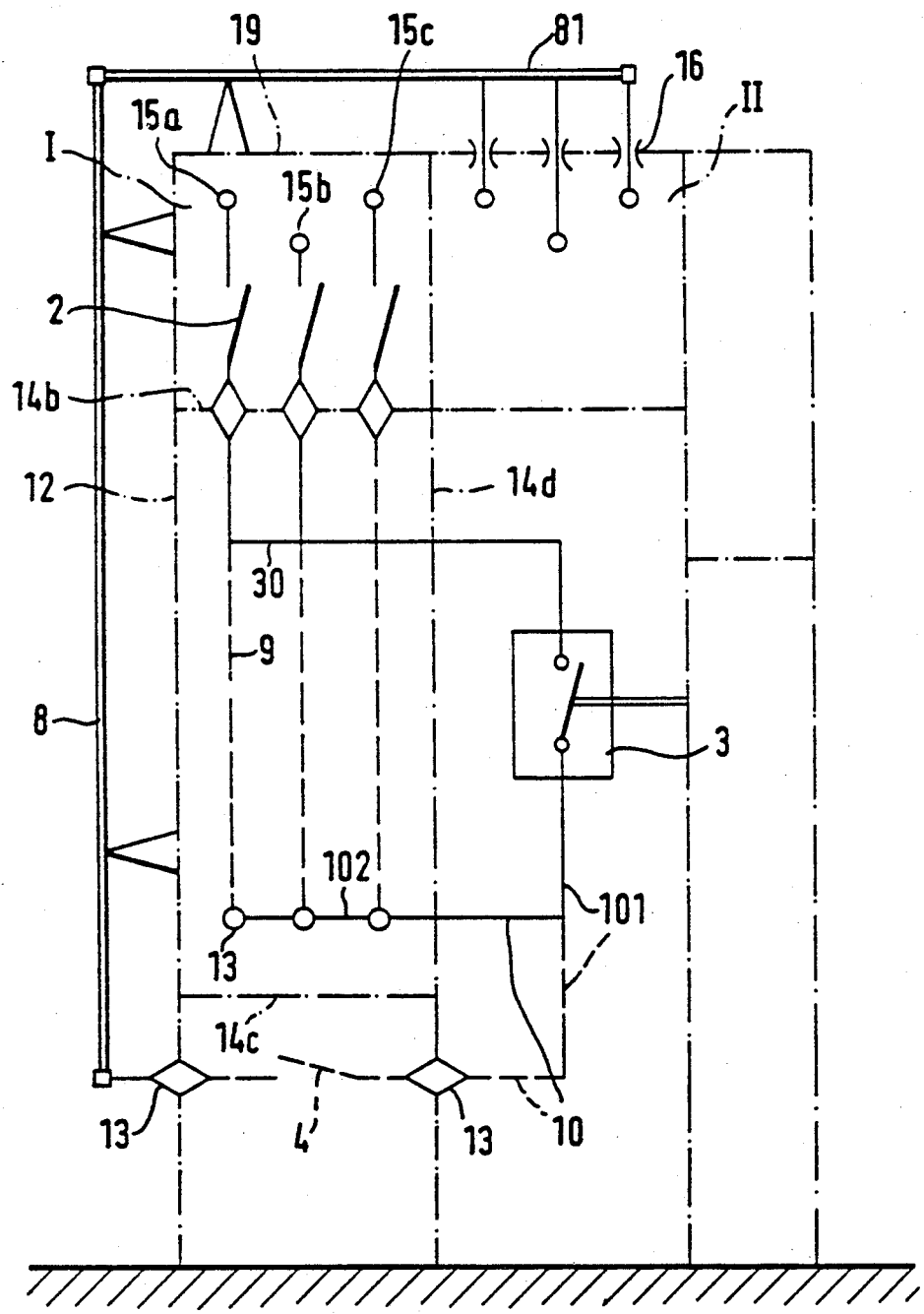
FIG. 4a is a sectional view along line 4a—4a through coupling field KFI of FIG. 4c showing a dual bus bar system with systems I and II at the top and the bus bars arranged in a triangle, the line arrangement being shown schematically.
Figure 4B:
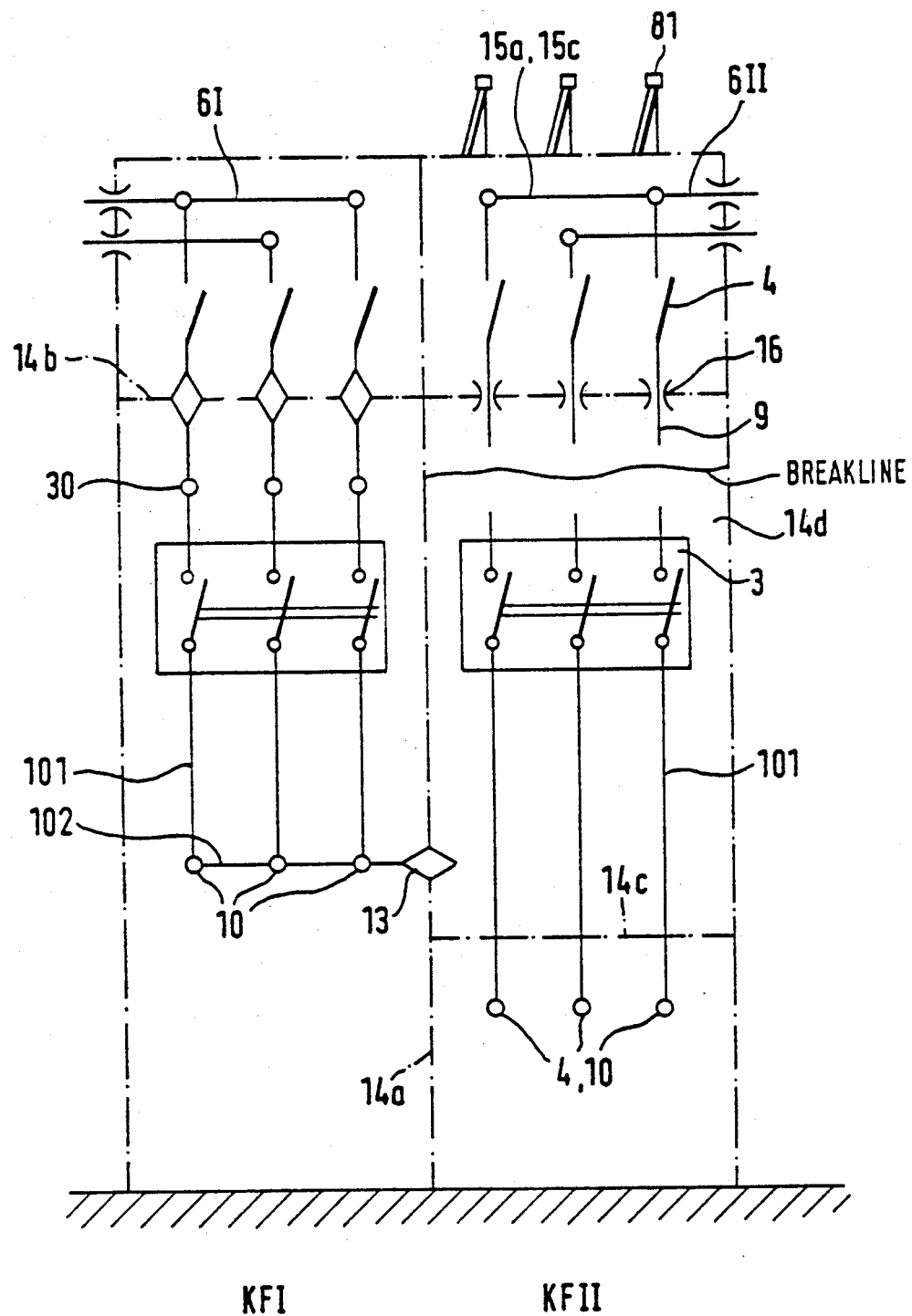
FIG. 4b kis a front view of FIG. 4ak with the front cover removed.
Figure 4C:
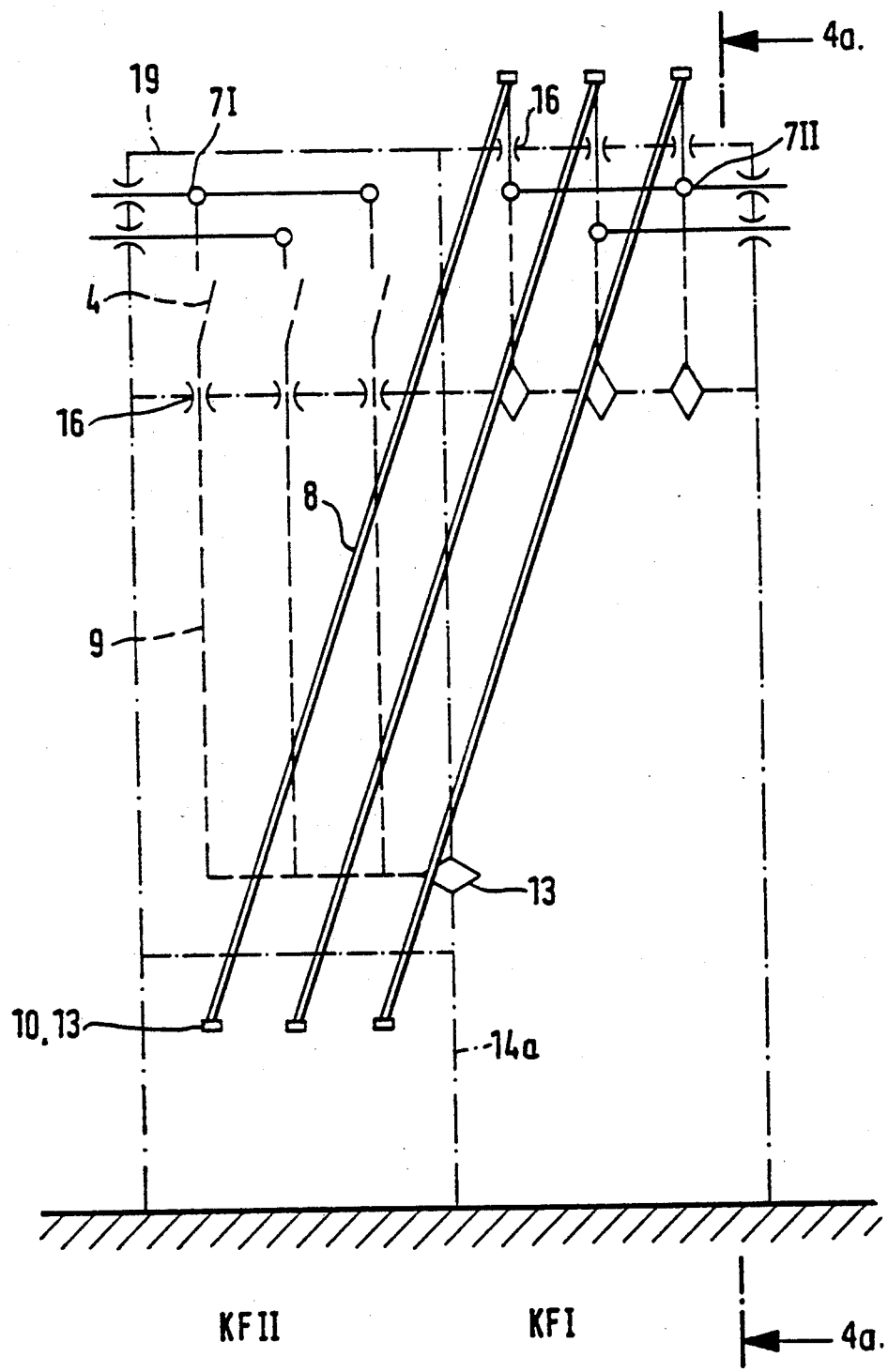

Referring to FIG. 4b, in coupling field KFI, the lower terminals of coupling switch 3 are followed by line sections 10 and angled sections 101 and 102 leading to passages 13 disposed in a horizontal plane in vertical partition 14a between coupling fields KFI and KFII. In coupling field KFII, angled coupling lines 9 follow and lead, in three parallel planes spaced from one another at the spacing between the center lines of the bus bars, to terminals 16 of second end sections 7I. The second disconnect switches 4 of bus bar system I are disposed within the partitioned bus bar chamber of second end sections 7I. FIG. 4b shows the bus bar chamber open so that second disconnect switches 4 become visible.

Referring to FIG. 4a, in coupling field KFII, the horizontal line sections 10 and angled sections 101 lead by phases from coupling switch 3 through passages 13 disposed in vertical partition 14d to second disconnect switches 4 of bus bar system II and from there to passages 13 disposed in rear cover 12.

In coupling field KFII, a horizontal partition 14c (FIG. 4b) is required to protect bus bar systems I and II in addition to vertical partition 14d (FIG. 4a), while the switch chamber of coupling field KFI remains unpartitioned in the interior. From passages 13, coupling lines 8 extend obliquely upward on rear cover 12 (FIGS. 4a, 4c) toward coupling field KFI and as horizontal sections 81 parallel to upper cover 19 until they reach terminals 16 of second bus bar end sections 7II.

In FIG. 4b, the lines outside terminals 16 in coupling field KFII are broken off to illustrate coupling switch 3 and second disconnect switch 4 of bus bar system II and its line sections 10. Line sections 10 of bus bar systems I and II here intersect in coupling field KFII while being partitioned from one another.

Figure 4D:
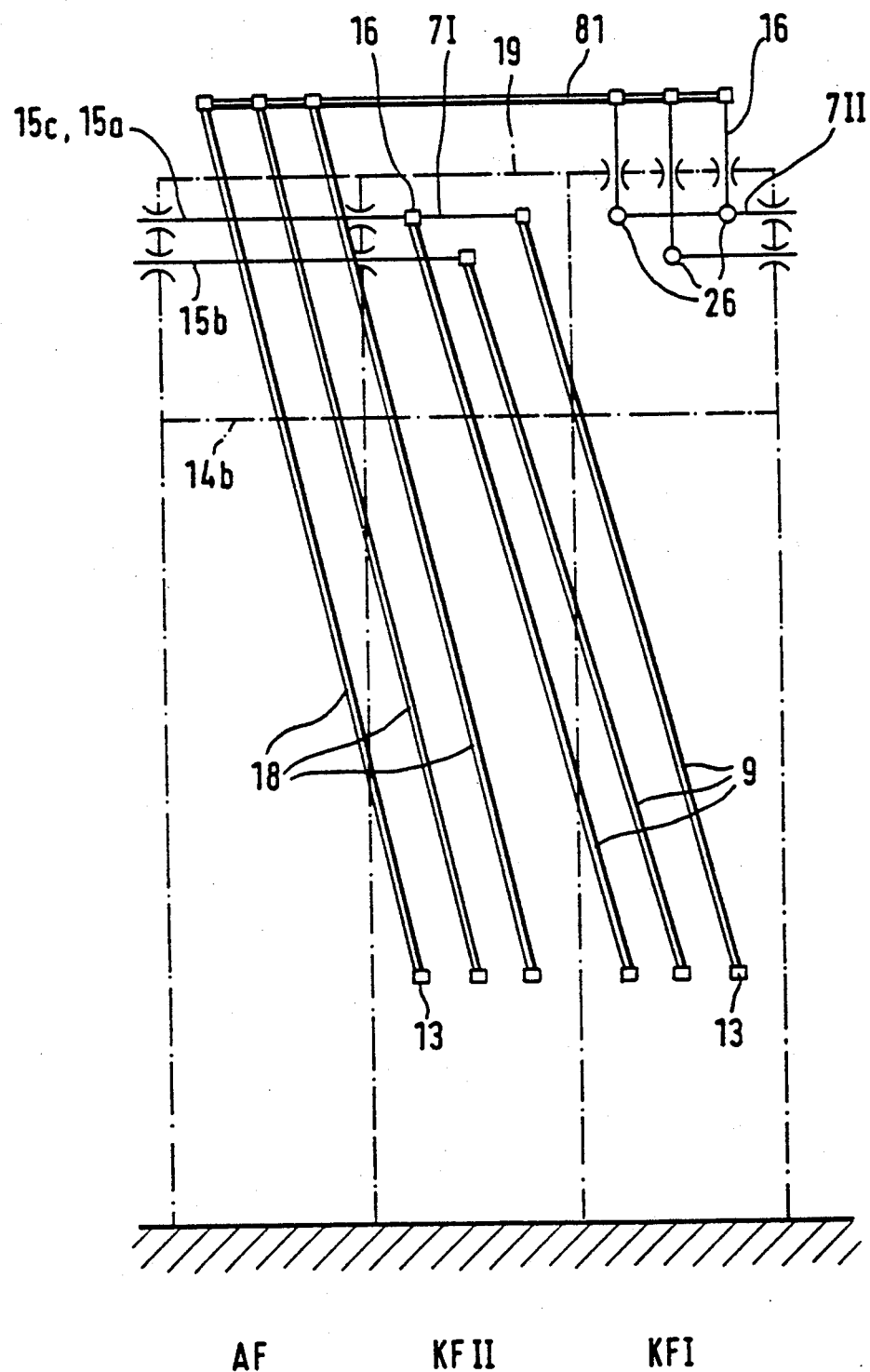
FIG. 4d is a rear view of FIG. 4a with coupling lines arranged externally without crossovers.

If the encapsulated switch chamber of coupling field KFII does not permit an arrangement of lines as shown in FIGS. 4a and 4b with coupling lines crossed in the interior of the switching system, with the necessary partitioning, it is possible to provide, similarly to the embodiment illustrated in FIGS. 2a and 2b, an arrangement of all coupling lines on the rear of the switching system without crossovers. Within the two coupling fields KFI and KFII, the second disconnect switches 4 are then connected, via the angled sections 101 and line sections 10, with coupling switch 3 and passages 13 in rear cover 12, similarly to the manner shown in FIG. 4a for bus bar system II. Coupling lines 9 of bus bar system I then extend, as shown in FIG. 4d, from passages 13 in coupling field KFI at the bottom obliquely upward to terminals 16 of second bus bar end section 7I disposed in coupling field KFII. These terminals 16 lie staggered in the planes of bus bars 15a, 15c and 15b, respectively, of bus bar system I on rear cover 12 of the switch housing.

Each one or the second bus bar end sections 7I ends at a connection point 26 for the individual phase.

From lower passages 13 in coupling field KFII of bus bar system II, linear coupling lines 18 lead upwardly, followed, according to FIG. 4d, by angled horizontal sections 81 which lead via terminals 16 in upper cover 19 of coupling field KFI to second bus bar end sections 7II.

Figure 4E:
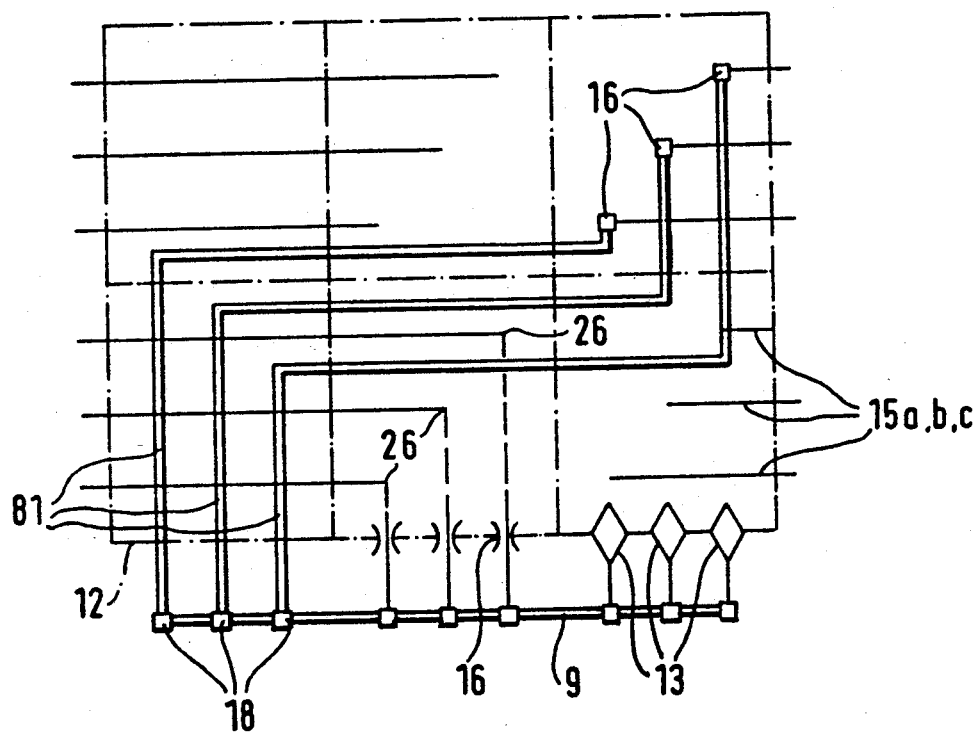
FIG. 4e is a top view of FIG. 4d.

In order to be able to keep the depth of the switch housing as small as possible in this case as well, coupling lines 18 do not cross over coupling lines 9 but, according to FIGS. 4d and 4e, extend on the rear of the adjacent outgoing or incoming field AF in the same plane, parallel to rear cover 12 around terminals 16 of bus bar system I. Coupling lines 18 as well as sections 81 on the upper side of the switching system are here connected with covers 12 and 19 merely to provide a mechanical support so that the entire interior configuration of outgoing field AF remains untouched.

Figure 5A:
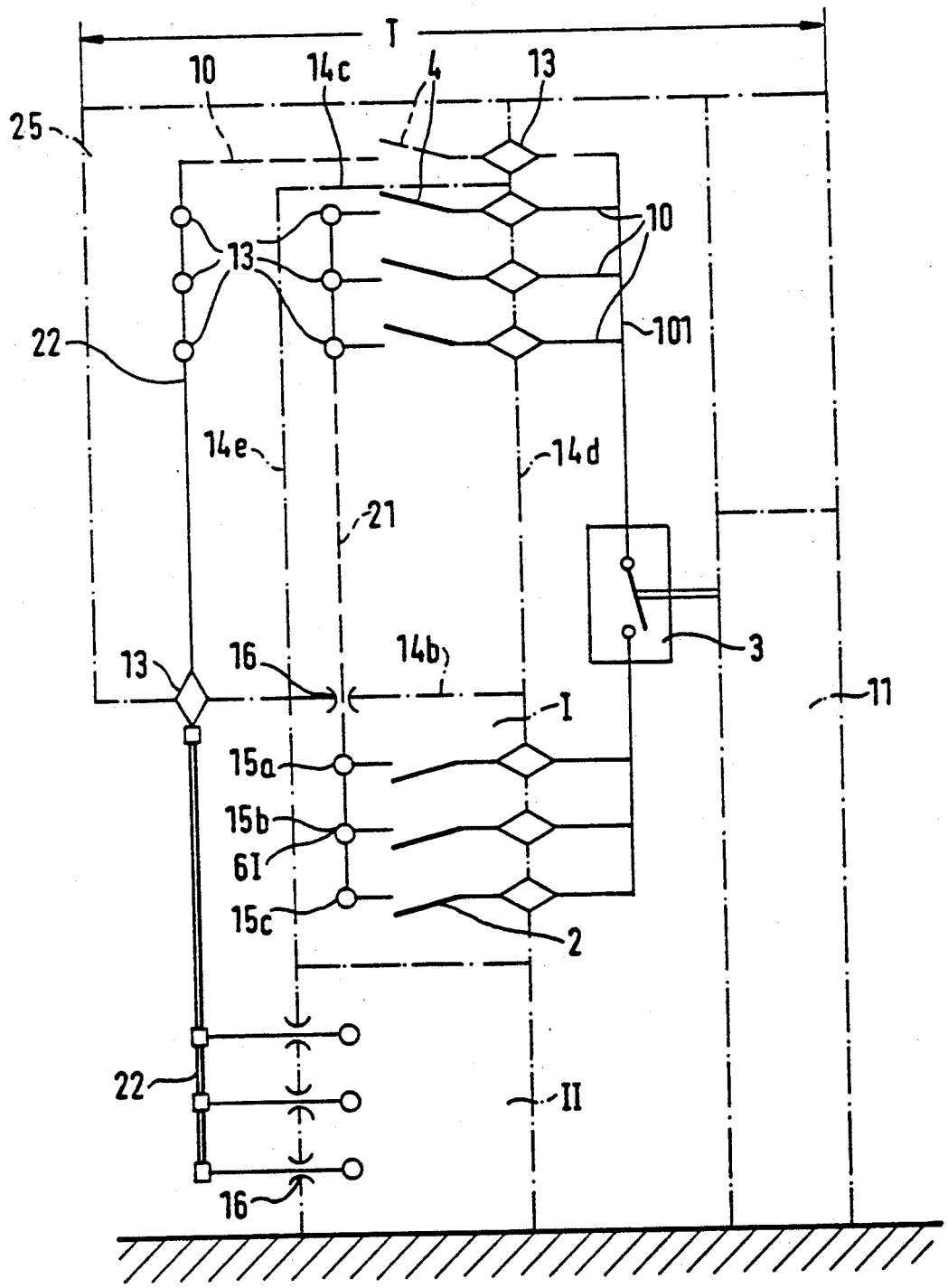
FIG. 5a is a sectional view through line 5a—5a of coupling field KFI of FIG. 5b kshowing an encapsulated switching system with longitudinal coupling for a dual bus bar system with wiring space arranged at the top of the switch housing.
Figure 5B:
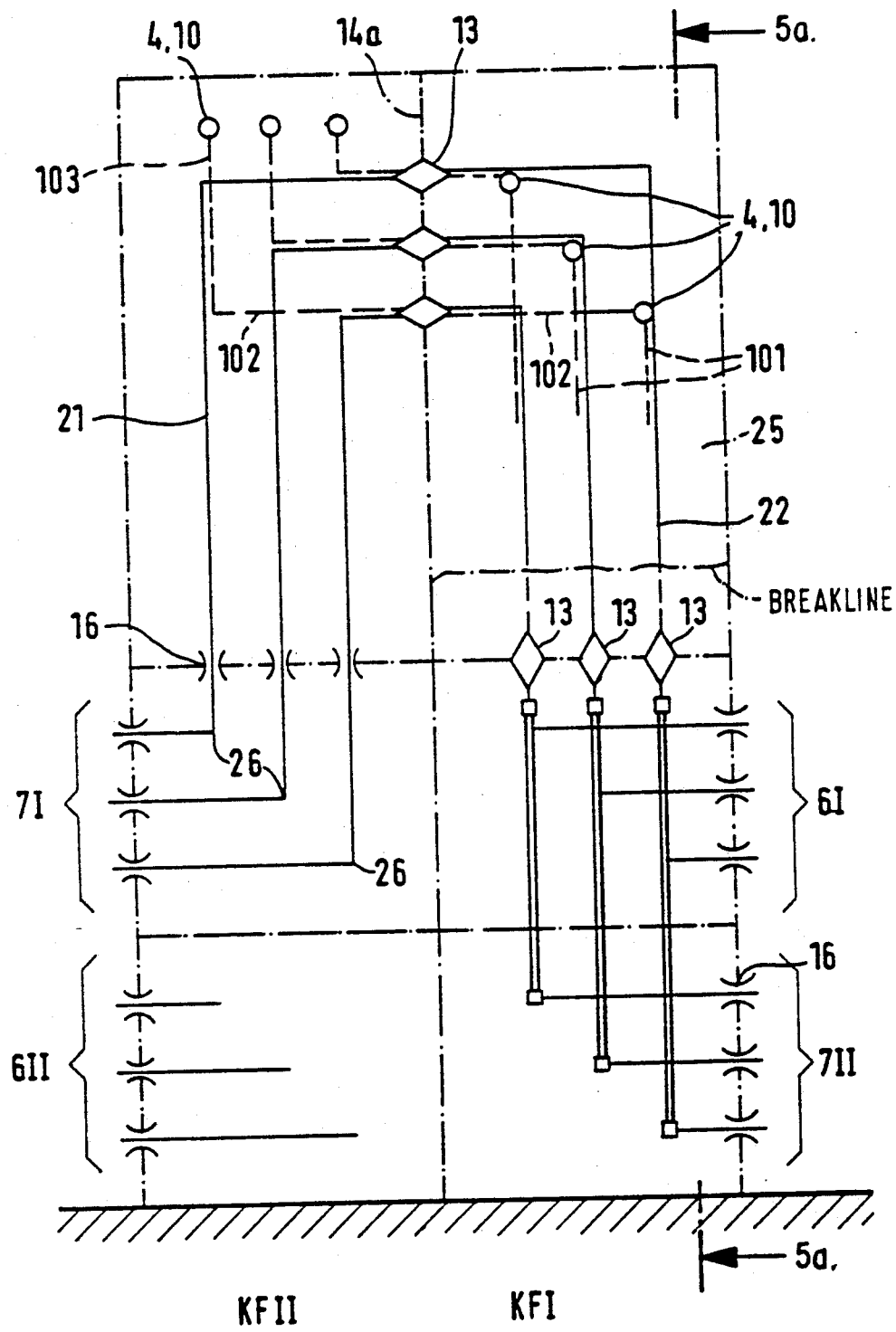
FIG. 5b is a rear view of FIG. 5ak with the rear cover 12 in coupling field KFII removed and the cover partially removed in coupling field KFI.

The invention can also be used to great advantage for switching systems having bus bars disposed at the bottom and cable connections at the top as shown in FIGS. 5a and 5b. Such switching systems generally have an outgoing chamber 25 above the switch chamber, and the bus bar chambers have a depth T exceeding that of the chambers disposed therebelow. The large depth T of the bus bar chambers can be utilized in the coupling fields to accommodate a major portion of the coupling lines including the transition into the adjacent field so that parts of the coupling lines need be provided outside the encapsulation only below the location at which the cable terminals lie in an outgoing field. However, these coupling line parts do not exceed the exterior profile of the cross section of the switching system. According to FIG. 5a, coupling field KFI of the upper bus bar system I is closest to coupling switch 3. The equipping of the two coupling fields with instruments and part of the connection is effected, as shown in FIG. 3a, with the upper and undersides exchanged, the same reference numerals being employed for identical components.

Thus, according to FIG. 5a, all of the lines from the first bus bar end sections 6I to the second bus bar end sections 7I of first bus bar system I employing a coupling line 21 are identical to those shown in FIGS. 3a and 3b. In FIG. 5b, a rear view of coupling field KF1 is shown in the lower portion of the drawing, with the rear wall opened above the break line, while coupling field KFII is shown all the way through without a rear wall. For better understanding, line sections 10 and sections 101 and 102 of bus bar system I in coupling field KFI are shown in dashed lines. Bus bar system I is continued in coupling field KFII in the form of coupling lines 21 which are brought phase by phase to terminals 16. Second bus bar end sections 7I end similarly as in their arrangement in FIG. 3c at connection points 26. The entire line path from passages 13 to end sections 7I, according to FIG. 5b, advantageously lies in a plane defined by the axes of second end sections 7I.

In coupling field KFII, the connection from the second disconnect switch 4 leads via line sections 10 and twice angled sections 102 and 103 to passages 13 in vertical partition 14a and from there in coupling field KFI as an internal section of coupling line 22 to passages 13 at the lower end of wiring space 25. This arrangement of the lines is shown in dashed lines in FIG. 5b. Coupling lines 22 connect passages 13 outside of the encapsulation with the terminals 16 of the second bus bar end sections 7II. Partitions 14c and 14e (FIG. 5a) partition the coupling lines and line sections of the two bus bar systems I and II from one another within the wiring spaces 25 of the two coupling fields KFI and KFII.

Figure 6B:
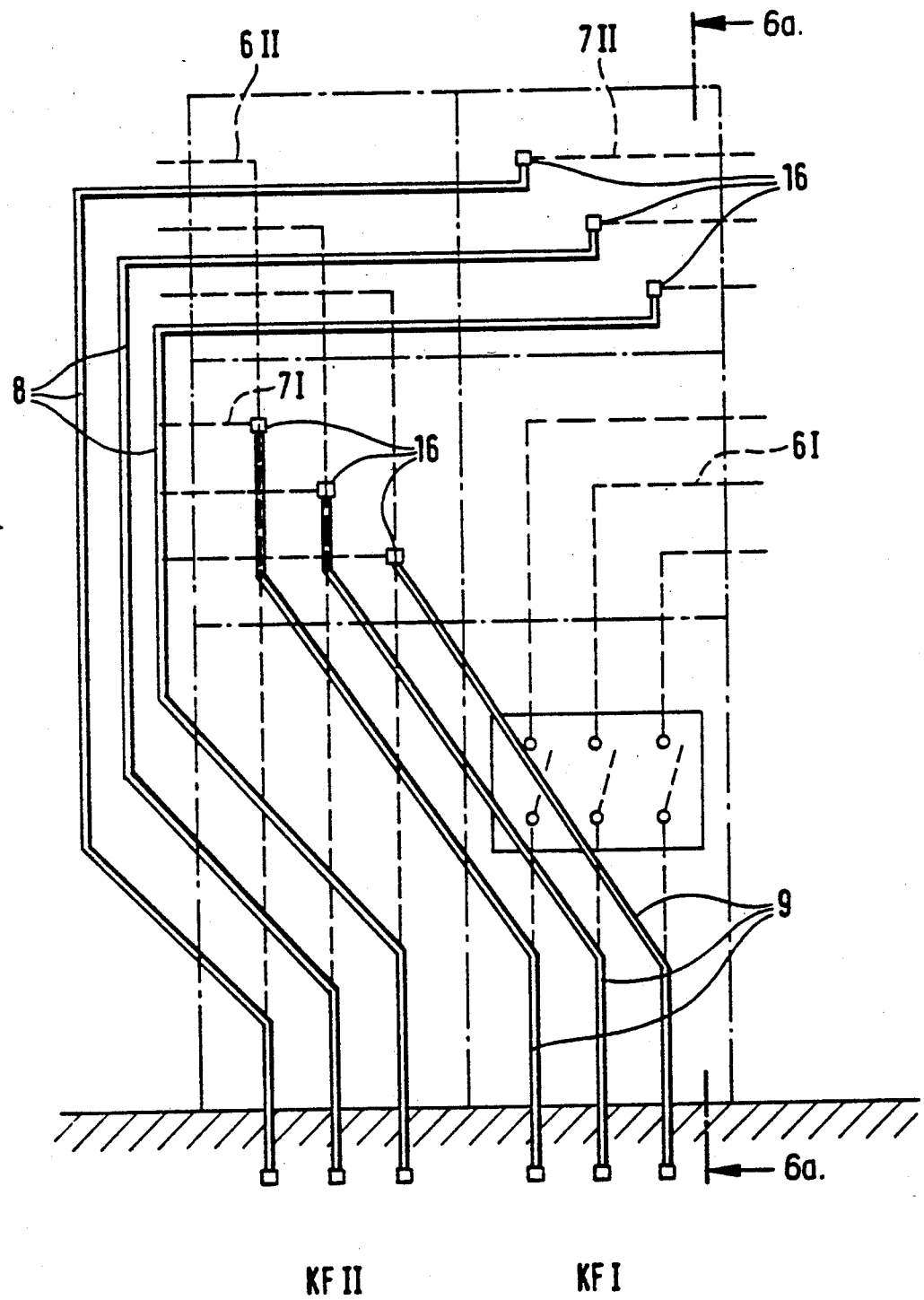

In switching systems having low structural height and small switch and wiring spaces it is not always possible to arrange second disconnect switch 4 in the switch space between coupling switch 3 and coupling lines 8 and 9, respectively. The present invention can also be employed in cases where second disconnect switch 4 is also accommodated in a known manner in the bus bar chamber of the second end sections 7I, 7II, 7III. This may advantageously be effected for second end sections 7I and 7II of FIGS. 6a and 6b by the incorporation of a bus bar chamber and disconnect switch 2, with the latter being rotated about 180° C. Bus bars 15a, 15b, 15c are then flush with those in the subsequent outgoing fields and the installed disconnect switches become second disconnect switches 4 in the course of the coupling. (See FIG. 6a, system II). As a further alternative, line sections 10 in both coupling fields KFI and KFII may lead downwardly toward passage 13 or other connecting means provided instead of the cable end caps in an outgoing field AF. From here, coupling lines 28 and 29 are brought horizontally backwards in the first portion along the underside of the switch housing and are angled when they change to the vertical direction. Similarly to FIG. 3c, on the rear of the switch housing, coupling lines 28, 29 are continued without crossovers until they reach terminals 16 of the respective second disconnect switches 4 and the second bus bar end sections 7I and 7II, with the coupling lines 28 of the second bus bar system II being brought over the rear of the adjacent outgoing or incoming field.

A configuration of coupling fields KFI and KFII similarly to FIGS. 2a and 2b with angled line sections 10 brought to the rear is also conceivable in which passages 13 are disposed in rear cover 12.

In switching systems in which, in the longitudinal coupling, the second disconnect switch 4 is incorporated together with the second bus bar end section 7I, 7II, 7III in the bus bar chambers, it is not possible, due to the size of these devices and their being driven from the front of the switching systems to provide terminals 16 at the underside of the bus bar chamber of bus bar system I and coupling lines 9 cannot be provided in a vertical plane as is the case, for example, in FIG. 3a.

In switching systems in which second disconnect switch 4 is also accommodated in the partitioned spaces of second bus bar end sections 7I, 7II, 7III, no need arises for the provision of additional partitions within the coupling fields even if the loads require a highly reliable current supply since the propagation of arc interferences is prevented in the best way possible.

The need for unification of the enclosures of the individual coupling fields can also forcibly bring about the provision, even for other structural types, e.g. as shown in FIGS. 2a, 2b, 3a to 3c and 4a to 4e, of passages 13 being attached to cover 27 of the cable chamber and to bring the coupling lines (28, 29) horizontally from there to the rear of the switch housing. These statements are not illustrated separately, since they correspond to those shown in FIGS. 6a to 6b.

Figure 7:
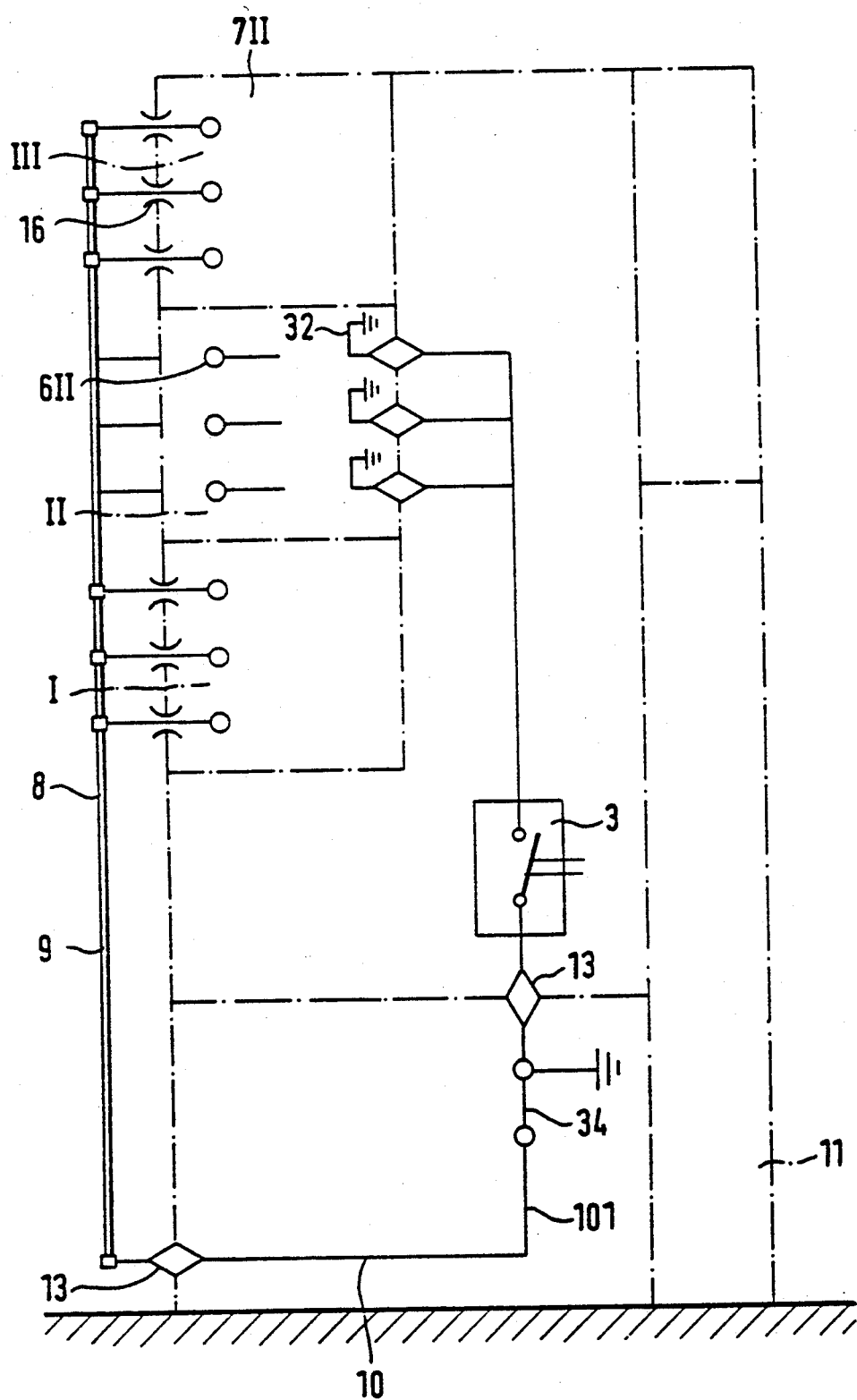
FIG. 7 is a sectional view along line 3a—3a through coupling field KFII of FIG. 3c showing a three-way switch instead of disconnect switch.

In a section analogous to that of section 2a—2a through coupling field KFII of FIG. 2b, shown in FIG. 2a, FIG. 7 shows, instead of the first and second disconnect switches, a first three-way switch 32 in coupling field KFII of bus bar system II in the bus bar chamber of first bus bar end sections 6II, and a second three-way switch 34 below coupling switch 3. The lines are arranged corresponding to FIG. 2a. Switch 32 is shown in the grounded-position and switch 34 in the ON-position If coupling switch 3 were now added, the bus bar section of bus bar system II following end sections 7II would be grounded. However, in a known manner, locks preventing an interconnection before the feeds into this system are disconnected.

The embodiments shown in FIGS. 1 to 7 constitute the most important embodiments of the basic idea of the invention but not the only ones. Other advantageous combinations in the arrangement of the coupling lines and in the equipment with devices are additionally also feasible within the scope of the invention.

Preferably, the coupling switches may be power switches which are provided in the outgoing and incoming fields of the switching system. However, the idea of the invention can also be used for switching systems in which a longitudinal separation is intended by means of one load switch per system. Moreover, in the longitudinal couplings according to the invention, current and voltage converters may also be incorporated in the coupling fields for the individual systems.

In the switch housing the compartments containing the outgoing field AF, the coupling fields KFI, KFII, KFIII and the bus bar systems I, II, III are encapsulated. The switch housing outside consists of sheet steel, while inside positioned partitions may be made of sheet steel or insulating material. Also the coupling lines 8, 9, 18, 22, 28, 29 if led outside of the switch housing, con be encapsulated in pipe like housings.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In an encapsulated switching system for longitudinal coupling of bus bars of multi-phase, multiple bus bar systems (I, II, III) installed in an encapsulated switch housing having a front section, a plurality of covers including a rear cover (12) and a top cover (19), inner partitions separating portions the bus bar systems from one another, and a plurality of coupling fields (KFI, KFII, KFIII) in which sections of the bus bars are electrically connected together, and wherein:

(a) at least two bus bars (15a, 15c) of each multi-phase bus bar system have axes arranged in a plane which is at least approximately parallel to the nearest cover (12, 19);

(b) the bus bars of the respective multi-phase bus bar systems (I, II, III) have first end sections (6I, 6II, 6III) and second end sections (7I, 7II, 7III), the first end sections (6I, 6II, 6III) of the respective bus bar systems (I, II, III) and the second end sections &7I, 7II, 7III) of the respective bus bar systems (I, II, III) being arranged in different coupling fields (KFI, KFII, KFIII), each of the first end sections (6I, 6II, 6III) of the respective bus bar systems (I, II, III) being connected to respective first disconnect switches (2) and coupling switches (3) in the respective coupling fields (KFI, KFII, KFIII) identified as the associated coupling field of the respective bus bar systems (I, II, III);

(c) second disconnect switches (4) are provided in each coupling field (KFI, KFII, KFIII) connected at one end to a respective one of the coupling switches (3) in that coupling field, and coupling lines (8, 9, 17, 18, 21, 22, 28, 29, 81) are provided for connecting the other ends of the second disconnect switches (4) to a connection point (26) at a respective one of the second bus bar end sections (7I, 7II, 7III), the coupling lines being connected to the connection points by way of terminals (16) that are brought through, in an insulated manner, one of (i) a first partition (14b) surrounding the respective second bus bar end sections (7I, 7II, 7III) or (ii) one of the housing covers (12, 19); and (d) the coupling switches have poles arranged in one of a straight line or slightly offset with respect to the front section of the switch housing;

the improvement wherein:

(a) the switch housing has first and second opposite sides, the first bus bar end sections (6I) of the first bus bar system (I) lead from the first side of said housing into a first one of said coupling fields (KFI), the second bus bar end sections (7I) of the first bus bar system (I) lead from the second side of said housing into a second one of said coupling fields (KFII) which is adjacent said first coupling field (KFI), said first and second bus bar end sections (6I, 7I) of the first bus bar system (I) are axially aligned and are electrically connected to one another by way of electrical conductors which extend from the first bus bar end sections (6I) of the first bus bar system (I) downwardly in said first coupling field (KFI) through associated ones of said coupling switches (3) and subsequently by way of a first set of said coupling lines (9) upwardly to the second bus bar end sections (7I) of the first bus bar system (I); and (b) the first bus bar end sections (6II, 6III) of at least one additional bus bar system (II, III) lead into the switching system from the second side of said housing, the second bus bar end sections (7II, 7III) of said at least one additional bus bar system (II, III) are led from the first side of said housing into said first coupling field and passed through one of the rear cover (12) or the top cover (19) and, by way of at least one additional set of said coupling lines (8, 17), behind said rear cover to the nearest respective free coupling field (KFIII) or switching field (AF) and from there downwardly to the associated coupling field (KFII, KFIII) from where said at least one additional set of coupling lines (8, 17) is passed through said rear cover (12) into the associated coupling field (KFII, KFIII) and led, by way of the associated coupling switches (3) within the respective associated coupling field (KFII, KFIII), upwardly for coupling to the first bus bar end sections (6II, 6III) of said at least one additional bus bar section system (II, III).

2. An encapsulated switching system as defined in claim 1, wherein as to each bus bar system (I, II, III):
   (a) two bus bars (15a, 15c) of a first one of the bus bar systems (I) have axes which define a plane approximately parallel to said rear cover, and in each coupling field (KFI, KFII, KFIII) said first disconnect switches (2), said coupling switches (3) and said second disconnect switches (4) are disposed in front of the plane defined by the axes of said two bus bars (15a, 15c) of the first bus bar system (I) which are at least approximately parallel to the rear cover (12);
   (b) respective ones of said terminals (16) penetrate said rear cover (12) in adjacent ones of said coupling fields (KFI, KFII, KFIII); and
   (c) said rear cover (12) is provided with passages (13), and said switching system further includes line sections (10, 101) installed in the interior of the respective coupling fields (KFI, KFII, KFIII), said coupling lines (8, 9, 17) for the respective bus bar systems (I, II, III) extending from respective ones of said terminals (16) parallel to said rear cover (12) to said passages (13) and, via said line sections (10, 101) to said other end of respective ones of said disconnect switches (4).

3. An encapsulated switching system as defined in claim 1, wherein:
   (a) each of said bus bar systems (I, II, III) have coupling fields (KFI, KFII, KFIII), said switch housing has a rear cover (12), and a first one of said bus bar systems (I) has two bus bars (15a, 15c) with axes defining a plane approximately parallel to said rear cover (12), and in the of the coupling fields (KFI, KFII, KFIII) of all bus bar systems (I, II, III) said first disconnect switches (2), said coupling switches (3) and said second disconnect switches (4) are disposed in front of the plane defined by the axes of the two bus bars (15a, 15c) of the first bus bar system (I) which are at least approximately parallel to the rear cover (12);
   (b) in the second one of said coupling fields (KFII), which is adjacent the first one of the coupling fields (KFI) of the first one of said bus bar systems (I), said terminals (16) connected with said connection points (26) penetrate said first partition (14b) in one of said plane and a second plane parallel to said plane at a slight distance from said plane, and the second end sections (7I) of the phases of said first one of the bus bar systems (I) ends phase by phase at their connection points (26) at a distance that is sufficient with respect to high voltages from the terminal (16) associated with the respective adjacent phase;
   (c) within the encapsulation of said switching system, the coupling lines (9, 21) coupling the first end sections (6I) to the second end sections (7I) of said first one of the bus bar systems (I) extend from respective ones of the terminals (16) in a common vertical plane from said adjacent second coupling field (KFII) through respective passages (13) disposed in a second vertical partition (14a) into said first one of the coupling fields (KFI) in said first one of the bus bar systems (I) and, by means of angled line sections (10, 101), to terminals of respective second disconnect switches (4) disposed in said first coupling field (KFI);
   (d) in each of the coupling fields adjacent to the coupling fields of at least the second bus bar system (II), said terminals (16) which are connected with the connection points (26) pass through said rear cover (12);
   (e) coupling lines (8) coupling the first and second end sections (6II, 7II) of the bus bars of at least the second one of the bus bar system (II) extend from said terminals (16) parallel to said rear cover (12) to passages (13) and, by way of line sections (10, 101) installed in the interior of the coupling fields (KFII, KFIII), to the terminals of said second disconnect switches (4);
   (f) coupling lines (9, 21) coupling the first and second bus bar sections (6I, 7I) of said first bus bar system (I) are separated by a third partition (14d) from said line sections (10) of said second bus bar system (II) in said second coupling field (KFII).

4. An encapsulated switching system as defined in claim 1, wherein:
   (a) each bus bar system (I, II, III,) has coupling fields (KFI, KFII, KFIII), said switch housing has a rear cover (12), two bus bars (15a, 15c) of a first one of the bus bar systems (I) have axes which define a plane at least approximately parallel to said rear cover (12), and in the coupling fields (KFI, KFII, KFIII) of all bus bar systems (I, II, III) said first disconnect switches (2), said coupling switches (3) and said second disconnect switches (4) are arranged in front of the plane defined by the axes of the said two bus bars (15a, 15c) of the first bus bar system (I) which are at least approximately parallel to the rear cover (12);
   (b) in the second one of said coupling fields (KFII) which is adjacent the first one of said coupling fields (KFI) in the first one of said bus bar systems (I) the terminals (16) connected with the connecting points (26) penetrate, in one of said plane and another plane parallel to and at a slight distance from said plane, a lower bus bar chamber cover, with the second end sections (7I) of said first bus bar system (I) ending phase by phase at their connection points (26) at a distance sufficient with respect to high voltages from the terminal (16) of the respective adjacent phase;
   (c) in the coupling fields adjacent to the coupling fields of at least said second bus bar systems (II), the terminals (16) connected with the connection points (26) penetrate said rear cover (12);
   (d) the coupling lines (8, 9, 17) coupling the first and second end sections of said bus bar systems (I, II, III) extend from the terminals (16) parallel to the adjacent rear cover (12) to passages (13) and, via line sections (10, 101) installed in the interior of said coupling fields (KFI, KFII, KFIII), to the terminals of the respective second disconnect switches (4); and
   (e) in a third one of the coupling fields (KFIII), the coupling lines (9, 21) coupling the first and second end sections (6I, 7I) of the first bus bar system (I) are separated from the line sections (10) of the second bus bar system (II) by a second partition (14d).

5. An encapsulated switching system as defined in claim 1, wherein:

(a) two bus bars (15a, 15c) of a first one of said bus bar systems (I) have axes which define a plane approximately parallel to said upper cover (19), and in the coupling fields (KFI, KFII, KFIII) of all bus bar systems (I, II, III) said first disconnect switches (2), said coupling switches (3) and said second disconnect switches (4) are arranged underneath the plane defined by the axes of said two bus bars (15a, 15c) of said first bus bar system (I) which are at least approximately parallel to the upper cover (19);

(b) said first partition (14b) is oriented in the horizontal direction, and said terminals (16) penetrate said horizontal partition (14b) in the vertical direction and in said second coupling field (KFII) said second disconnect switches (4) are disposed between the connection points (26) and said terminals (16) which penetrate said horizontal partition (14b) in the vertical direction;

(c) a vertical partition (14a) separates said adjacent first and second coupling fields (KFI, KFII) and within the encapsulation of the switch housing the coupling lines (9, 21) coupling the first end sections (6I) with the second end sections (7I) of said first bus bar system (I) extend from said terminals (16) of said adjacent system (KFII) via passages (13) disposed in a horizontal plane in said vertical partition (14a) into the coupling field (KFI) of said first bus bar system (I) and, via angled line sections (10, 101), to the terminals of the coupling switch (3) in said first coupling field (KFI);

(d) in at least a coupling field adjacent said second coupling field, the terminals (16) connected with the connection points (26) penetrate said upper cover (19);

(e) the coupling lines coupling the first end sections with the second end sections of at least the second bus bar system (II) extend from terminals (16) parallel to the respective covers (12, 19) to passages (13) and, via line sections (10, 101) installed in the interior of the coupling fields (KFII, KFIII), to the terminals of the second disconnect switches (4);

(f) a second partition (14d) separates coupling lines (9, 21) coupling the first end sections (6I) with the second end sections (7I) of said first bus bar system (I) from line sections (10) of said second bus bar system (II).

6. An encapsulated switching system as defined in claim 1, wherein:

(a) two bus bars (15a, 15c) of a first one of said bus bar systems (I) have axes which define a plane approximately parallel to said upper cover (19), and in the coupling fields (KFI, KFII, KFIII) of all bus bar systems (I, II, III) said first disconnect switches (2), said coupling switches (3) and said second disconnect switches (4) are disposed underneath the plane defined by the axes of said two bus bars (15a, 15c) of said first bus bar the system (I) which are at least approximately parallel to the upper cover (19);

(b) in said second coupling field (KFII) adjacent to said first coupling field (KFI) of the first bus bar system (I), terminals (16) connected with the connection points (26) penetrate said rear cover (12), in said plane or in a plane parallel to said plane at a slight distance, with said second end sections (7I) ending phase by phase at their connection points (26) at a distance that is sufficient for high voltages from the terminal (16) of the respective adjacent phase;

(c) in at least a coupling field adjacent to the second coupling field (KFII) the terminals (16) connected with the connection points (26) penetrate said upper cover (19); and (d) the coupling lines of all bus bar systems (I, II, III) extend from terminals (16) parallel to the respectively adjacent cover (12, 19) to passages (13) and, via line sections (10, 101) installed in the interior of the coupling fields (KFII, KFIII) to the terminals of the respective second disconnect switches (4).

7. An encapsulated switching system as defined in claim 1, wherein:

(a) two bus bars (15a, 15c) of a first one of the bus bar systems (I) have axes which define a plane at least approximately parallel to said rear cover (12), and in the coupling fields (KFI, KFII, KFIII) of all bus bar systems (I, II, III) said first disconnect switch (2), said coupling switch (3) and said second disconnect switch (4) are arranged in front of the plane defined by the axes of the said two bus bars (15a, 15c) of said first bus bar system (I) which are at least approximately parallel to the rear cover;

(b) in said second coupling field (KFII) the terminals (16) connected with the connection points (26) penetrate said partition (14b) in one of said plane or another plane parallel to and at a slight distance from said plane, with the second end sections (7I) of said first bus bar system ending phase by phase at their connection points (26) at a distance sufficient with respect to high voltages from the terminal (16) of the respective adjacent phase;

(c) in at least a coupling field adjacent to the coupling field (KFII) the terminals (16) connected with the connection points (26) penetrate said rear cover (12);

(d) coupling lines (21, 22) coupling first and second end sections of all bus bar systems (I, II, III) extend within wiring spaces (25) of the coupling fields disposed above chambers housing the bus bars, with the coupling lines of at least the second bus bar system (II) being brought through passages (13) disposed at the underside of said wiring space (25);

(e) a second vertical partition (14a) separates the first and second coupling fields (KFI, KFII), and coupling lines (21) coupling the first and second end sections of the first bus bar system (I) extend from said terminals (16) in a common vertical plane from the adjacent second coupling field (KFII) through passages (13) disposed in said vertical partition (14a) into the coupling field (KFI) of the first bus bar system and, by means of angled line sections (10, 102), to the terminals of the respective second disconnect switches (4);

(f) coupling lines (22) coupling the first and second end sections (6II, 7II) of at least the second bus bar system (II) have interior sections which extend from passages (13) in a common vertical plane out of the respectively adjacent first and second coupling fields (KFI, KFII) through passages (13) disposed in said second, vertical partition (14a) into the associated coupling fields (KFII, KFIII) of the respective bus bar system (II, III) and, by means of angled line sections (10, 101, 102, 103), to the terminals of the respective second disconnect switches (4);

(g) said coupling lines (22) of at least the second bus bar system (II) have sections disposed outside the encapsulation of said switch housing which connect said terminals (16) with the passages (13) in the respectively adjacent coupling field (KFI, KFII); and (h) third and fourth partitions (14c, 14e) are provided in wiring space of the first and second coupling fields (KFI, KFII) for separating coupling lines (21, 22) of one bus bar system (I, II) from line sections (10) and their angled sections (101, 102, 103) of the other bus bar system (I, II).

8. An encapsulated switching system as defined in claim 1, wherein:

(a) two bus bars (15a, 15c) of a first one of the bus bar systems (I) have axes which define a plane at least approximately parallel to said rear cover (12), and in the coupling fields (KFI, KFII, KFIII) of all bus bar systems the respective first disconnect switches (2) and the coupling switches (3) are disposed in front of the plane defined by the axes of two bus bars (15a, 15c) of the first bus bar system (I) which are at least approximately parallel to said rear cover (12);

(b) in each coupling field (KFI, KFII, KFIII) respective ones of the second disconnect switches (4) are disposed in respective bus bar chambers housing said second end sections (7I, 7II, 7III) between connection points (26) and a terminal (16) penetrating said rear cover (12); and (c) coupling lines (8, 9, 17, 18, 28, 29) connecting the first and second end sections of the individual bus bar systems (I, II, III) extend from said terminals (16) parallel to the respectively adjacent cover (12) to passages (13) and, via line sections (10, 101, 102) installed in the interior of the coupling fields (KFI, KFII, KFIII), to terminals of the respective coupling switches (3).

9. An encapsulated switching system as defined in claim 1, wherein said second disconnect switch (4) of each phase of the first bus bar system (I) is accommodated in a horizontal line section (10) of the respective coupling line (9, 21) coupling the first and second end sections (6I, 7I) of said first bus bar system (I).

10. An encapsulated switching system as defined in claim 1, wherein said switch housing has a lower cable chamber cover, said partitions include partitions to form individual housings for the coupling fields (KFI, KFII, KFIII) of each bus bar system (I, II, III), passages (13) are provided in the housing of the coupling field (KFI, KFII, KFIII) of each bus bar system (I, II, III) at the location of cable terminals installed in outgoing fields (AF), and coupling lines (8, 9, 17, 18) coupling the first and second end sections of said bus bar systems (I, II, III) extending outside of the encapsulation of said encapsulated switch are attached to said rear cover and extend up to said passages (13) by means of members (28, 29) disposed underneath said cable chamber cover (27).

11. An encapsulated switching system as defined in claim 1, wherein said connecting points (26) between said second bus bar end sections (7I, 7II, 7III) of the individual phases and said terminals (16) of the coupling lines (8, 9, 17, 18, 21, 22, 81) coupling the first and second end sections are arranged as in an outgoing field (AF).

12. An encapsulated switching system as defined in claim 1, and including line sections (10) in each of the coupling fields (KFI, KFII, KFIII) forming part of the conductive path between first and second end sections of the bus bars; and a second partition (14c, 14d) including passages (13) for said line sections (10) between said second disconnect switches (4) and said coupling switches (3).

13. An encapsulated switching system as defined in claim 1, wherein coupling lines (8, 9, 18, 22, 28, 29) coupling the first and second end sections of the bus bar systems comprise a gas-insulated, single-pole, encapsulated bar system.

14. An encapsulated switching system as defined in claim 1, wherein coupling lines (8, 9, 10) coupling the first and second end sections of the bus bar systems comprise a solid insulated bar system.

* * * * *